United States Patent
Sahraei et al.

(10) Patent No.: US 11,616,581 B2
(45) Date of Patent: Mar. 28, 2023

(54) TECHNIQUES FOR CROSS-LINK INTERFERENCE MEASUREMENTS

(71) Applicant: QUALCOMM Incorporated, San Diego, CA (US)

(72) Inventors: Saeid Sahraei, San Diego, CA (US); Huilin Xu, San Diego, CA (US); Gokul Sridharan, Sunnyvale, CA (US); Muhammad Sayed Khairy Abdelghaffar, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 108 days.

(21) Appl. No.: 17/171,686

(22) Filed: Feb. 9, 2021

(65) Prior Publication Data
US 2022/0255647 A1    Aug. 11, 2022

(51) Int. Cl.
  *H04W 4/00* (2018.01)
  *H04B 17/345* (2015.01)
  *H04B 17/318* (2015.01)
  *H04L 5/00* (2006.01)
  *H04W 24/10* (2009.01)
  *H04W 72/0446* (2023.01)

(52) U.S. Cl.
  CPC ......... *H04B 17/345* (2015.01); *H04B 17/318* (2015.01); *H04L 5/0048* (2013.01); *H04L 5/0094* (2013.01); *H04W 24/10* (2013.01); *H04W 72/0446* (2013.01)

(58) Field of Classification Search
  None
  See application file for complete search history.

(56) References Cited

U.S. PATENT DOCUMENTS

| | | | |
|---|---|---|---|
| 2018/0323928 A1 | 11/2018 | Yang | |
| 2019/0253232 A1 | 8/2019 | Park et al. | |
| 2020/0228213 A1* | 7/2020 | Masai | H04J 11/0063 |
| 2020/0266908 A1* | 8/2020 | Qian | H04B 17/318 |
| 2020/0351690 A1 | 11/2020 | Zhu et al. | |

(Continued)

FOREIGN PATENT DOCUMENTS

WO    WO-2020163291 A1    8/2020

OTHER PUBLICATIONS

International Search Report and Written Opinion—PCT/US2022/014548—ISA/EPO—dated May 11, 2022.

*Primary Examiner* — Zewdu A Beyen
(74) *Attorney, Agent, or Firm* — Holland & Hart LLP

(57) ABSTRACT

Methods, systems, and devices for wireless communications are described. A user equipment (UE) may receive signaling from a base station that includes an indication of a configuration for measuring cross-link interference (CLI) and an indication of a reference subcarrier spacing (SCS). The configuration may be associated with a slot having more than 14 symbols and may indicate a resource allocation that includes a sounding reference signal (SRS) resource, a CLI resource, or both. The UE may use the SRS resource to measure an SRS and may use the CLI resource to measure a received signal strength indicator (RSSI). The UE may measure the SRS and the RSSI according to the reference SCS. The UE may determine a CLI level based on measuring the SRS, the RSSI, or both. The UE may transmit, to the base station, a report including an indication of the determined CLI level.

30 Claims, 18 Drawing Sheets

(56) References Cited

U.S. PATENT DOCUMENTS

2021/0006997 A1\* 1/2021 Jin ........................ H04L 5/0048
2021/0144574 A1\* 5/2021 Jin ........................ H04L 5/0048
2022/0061117 A1\* 2/2022 Liou ................... H04W 72/042

\* cited by examiner

TECHNIQUES FOR CROSS-LINK INTERFERENCE MEASUREMENTS

FIELD OF TECHNOLOGY

The following relates to wireless communications, including techniques for cross-link interference (CLI) measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for CLI measurements. Generally, the described techniques provide for configuring a communication device to manage interference, such as CLI. The communication device may support wireless communications according to a slot format configuration, which may allocate a number of downlink symbols for downlink communications, or uplink symbols for uplink communications, or both, within a slot. In some cases, the communication device may experience CLI on one or multiple symbols during the slot. For example, the CLI may occur when one or more uplink or downlink symbols (e.g., an interfering symbol) of a nearby communication device collides with one or more uplink or downlink symbols of the communication device. To enhance wireless communications while managing CLI, the communication device may be configured to support a slot having a slot duration greater than 14 symbols (e.g., which may in some examples also referred to as a "super-slot", a "combined slot", or an extended transmission time interval (TTI)) as described herein. The described techniques may thereby promote higher reliability and lower latency wireless communications, among other benefits, by reducing or mitigating CLI.

A method for wireless communication at a UE in a wireless communication system is described. The method may include receiving signaling indicating a configuration including a resource allocation of a SRS resource associated with a slot having more than 14 symbols, receiving, from a second UE, a SRS on the SRS resource associated with the slot, determining a CLI associated with the second UE based on measuring the SRS on the SRS resource during the slot, and transmitting a report including an indication of the CLI.

An apparatus for wireless communication at a UE in a wireless communication system is described. The apparatus may include a processor, memory coupled with the processor, and instructions stored in the memory. The instructions may be executable by the processor to cause the apparatus to receive signaling indicating a configuration including a resource allocation of a SRS resource associated with a slot having more than 14 symbols, receive, from a second UE, a SRS on the SRS resource associated with the slot, determine a CLI associated with the second UE based on measuring the SRS on the SRS resource during the slot, and transmit a report including an indication of the CLI.

Another apparatus for wireless communication at a UE in a wireless communication system is described. The apparatus may include means for receiving signaling indicating a configuration including a resource allocation of a SRS resource associated with a slot having more than 14 symbols, means for receiving, from a second UE, a SRS on the SRS resource associated with the slot, means for determining a CLI associated with the second UE based on measuring the SRS on the SRS resource during the slot, and means for transmitting a report including an indication of the CLI.

A non-transitory computer-readable medium storing code for wireless communication at a UE in a wireless communication system is described. The code may include instructions executable by a processor to receive signaling indicating a configuration including a resource allocation of a SRS resource associated with a slot having more than 14 symbols, receive, from a second UE, a SRS on the SRS resource associated with the slot, determine a CLI associated with the second UE based on measuring the SRS on the SRS resource during the slot, and transmit a report including an indication of the CLI.

Some examples of the method, apparatuses, and non-transitory computer-readable medium described herein may further include operations, features, means, or instructions for determining an active bandwidth part subcarrier spacing of the UE, comparing the active bandwidth part subcarrier spacing of the UE to a reference subcarrier spacing of the received SRS from the second UE, and where measuring the SRS on the SRS resource may be based on the active bandwidth part subcarrier spacing of the UE corresponding to the reference subcarrier spacing of the received SRS.

Some examples of the method, apparatuses, and non-transitory computer-readable medium described herein may further include operations, features, means, or instructions for determining a number of SRS symbols associated with the SRS resource based on the configuration and mapping the number of SRS symbols to a number of SRS symbol locations in the slot.

In some examples of the method, apparatuses, and non-transitory computer-readable medium described herein, the number of SRS symbols may be within a slot boundary associated with the slot.

In some examples of the method, apparatuses, and non-transitory computer-readable medium described herein, the slot having more than 14 symbols includes a set of multiple slots each having 14 or fewer symbols and the number of SRS symbols spans one or more slots of the set of multiple slots.

In some examples of the method, apparatuses, and non-transitory computer-readable medium described herein, receiving the SRS may include operations, features, means, or instructions for receiving the SRS on the number of SRS symbols in the slot based on the mapping of the number of SRS symbols to the number of SRS symbol locations in the slot.

In some examples of the method, apparatuses, and non-transitory computer-readable medium described herein, the number of SRS symbols includes one SRS symbol per the SRS resource, two SRS symbols per the SRS resource, or four SRS symbols per the SRS resource, or any combination thereof.

In some examples of the method, apparatuses, and non-transitory computer-readable medium described herein, the number of SRS symbols correspond to a repetition factor indicating a repetition of SRS symbols in the slot.

In some examples of the method, apparatuses, and non-transitory computer-readable medium described herein, the slot having more than 14 symbols includes two or more contiguous slots in a time domain.

In some examples of the method, apparatuses, and non-transitory computer-readable medium described herein, the signaling includes a radio resource control (RRC) message, a downlink control information (DCI) message, or a medium access control-control element (MAC-CE) message, or any combination thereof.

Some examples of the method, apparatuses, and non-transitory computer-readable medium described herein may further include operations, features, means, or instructions for measuring a reference signal received power (RSRP) based on the measuring of the SRS on the SRS resource, determining that the RSRP satisfies a threshold, and where determining the CLI from the second UE may be based on the determining that the RSRP satisfies the threshold.

A method for wireless communication at a UE in a wireless communication system is described. The method may include receiving signaling indicating a configuration including a resource allocation of a CLI resource associated with a slot having more than 14 symbols, measuring a reference signal strength indicator (RSSI) on the CLI resource based on a criterion, determining a CLI associated with a second UE based on the measuring of the RSSI on the CLI resource during the slot, and transmitting a report including an indication of the CLI.

An apparatus for wireless communication at a UE in a wireless communication system is described. The apparatus may include a processor, memory coupled with the processor, and instructions stored in the memory. The instructions may be executable by the processor to cause the apparatus to receive signaling indicating a configuration including a resource allocation of a CLI resource associated with a slot having more than 14 symbols, measure a RSSI on the CLI resource based on a criterion, determine a CLI associated with a second UE based on the measuring of the RSSI on the CLI resource during the slot, and transmit a report including an indication of the CLI.

Another apparatus for wireless communication at a UE in a wireless communication system is described. The apparatus may include means for receiving signaling indicating a configuration including a resource allocation of a CLI resource associated with a slot having more than 14 symbols, means for measuring a RSSI on the CLI resource based on a criterion, means for determining a CLI associated with a second UE based on the measuring of the RSSI on the CLI resource during the slot, and means for transmitting a report including an indication of the CLI.

A non-transitory computer-readable medium storing code for wireless communication at a UE in a wireless communication system is described. The code may include instructions executable by a processor to receive signaling indicating a configuration including a resource allocation of a CLI resource associated with a slot having more than 14 symbols, measure a RSSI on the CLI resource based on a criterion, determine a CLI associated with a second UE based on the measuring of the RSSI on the CLI resource during the slot, and transmit a report including an indication of the CLI.

Some examples of the method, apparatuses, and non-transitory computer-readable medium described herein may further include operations, features, means, or instructions for determining an active bandwidth part subcarrier spacing of the UE, comparing the active bandwidth part subcarrier spacing of the UE to a reference subcarrier spacing of the CLI resource, and where measuring the RSSI on the CLI resource may be based on the active bandwidth part subcarrier spacing of the UE corresponding to the reference subcarrier spacing of the CLI resource.

Some examples of the method, apparatuses, and non-transitory computer-readable medium described herein may further include operations, features, means, or instructions for determining that the reference subcarrier spacing of the CLI resource and the active bandwidth part subcarrier spacing of the UE may be the same and where measuring the RSSI on the CLI resource may be based on the determining that the reference subcarrier spacing of the CLI resource and the active bandwidth part subcarrier spacing of the UE may be the same.

In some examples of the method, apparatuses, and non-transitory computer-readable medium described herein, the CLI resource crosses a slot boundary of the slot based on the reference subcarrier spacing of the CLI resource.

Some examples of the method, apparatuses, and non-transitory computer-readable medium described herein may further include operations, features, means, or instructions for determining that the reference subcarrier spacing of the CLI resource may be shorter than the active bandwidth part subcarrier spacing of the UE and where measuring the RSSI on the CLI resource may be based on the determining that the reference subcarrier spacing of the CLI resource may be shorter than the active bandwidth part subcarrier spacing of the UE.

In some examples of the method, apparatuses, and non-transitory computer-readable medium described herein, the CLI resource may be within a slot boundary of the slot having the more than 14 symbols based on the reference subcarrier spacing of the CLI resource.

In some examples of the method, apparatuses, and non-transitory computer-readable medium described herein, the CLI resource crosses a slot boundary of the slot having the more than 14 symbols based on the reference subcarrier spacing of the CLI resource.

Some examples of the method, apparatuses, and non-transitory computer-readable medium described herein may further include operations, features, means, or instructions for measuring the RSSI on the CLI resource associated with the slot based on the slot overlapping with the CLI resource, where the slot having more than 14 symbols includes two or more slots.

In some examples of the method, apparatuses, and non-transitory computer-readable medium described herein, the signaling includes a radio resource control message, a downlink control information message, or a medium access control-control element message, or any combination thereof.

A method for wireless communication at a base station in a wireless communication system is described. The method may include transmitting, to a UE, signaling indicating a configuration including a resource allocation of an SRS resource associated with a slot having more than 14 symbols and receiving, from the UE, a report including an indication of a measured CLI on the SRS resource.

An apparatus for wireless communication at a base station in a wireless communication system is described. The apparatus may include a processor, memory coupled with the processor, and instructions stored in the memory. The instructions may be executable by the processor to cause the apparatus to transmit, to a UE, signaling indicating a configuration including a resource allocation of an SRS resource associated with a slot having more than 14 symbols and receive, from the UE, a report including an indication of a measured CLI on the SRS resource.

Another apparatus for wireless communication at a base station in a wireless communication system is described. The apparatus may include means for transmitting, to a UE, signaling indicating a configuration including a resource allocation of an SRS resource associated with a slot having more than 14 symbols and means for receiving, from the UE, a report including an indication of a measured CLI on the SRS resource.

A non-transitory computer-readable medium storing code for wireless communication at a base station in a wireless communication system is described. The code may include instructions executable by a processor to transmit, to a UE, signaling indicating a configuration including a resource allocation of an SRS resource associated with a slot having more than 14 symbols and receive, from the UE, a report including an indication of a measured CLI on the SRS resource.

Some examples of the method, apparatuses, and non-transitory computer-readable medium described herein may further include operations, features, means, or instructions for selecting a time division duplex configuration designating uplink symbols or downlink symbols, or both, for the slot based on the measured CLI and transmitting, to the UE, the time division duplex configuration.

In some examples of the method, apparatuses, and non-transitory computer-readable medium described herein, a number of SRS symbols associated with the SRS resource may be within a slot boundary associated with the slot.

In some examples of the method, apparatuses, and non-transitory computer-readable medium described herein, a number of SRS symbols associated with the SRS resource crosses a slot boundary associated with the slot.

In some examples of the method, apparatuses, and non-transitory computer-readable medium described herein, the slot includes two or more contiguous slots in a time domain.

In some examples of the method, apparatuses, and non-transitory computer-readable medium described herein, the signaling includes a radio resource control message, a downlink control information message, or a medium access control-control element message, or a combination thereof.

A method for wireless communication at a base station in a wireless communication system is described. The method may include transmitting, to a UE, signaling indicating a configuration including a resource allocation of a CLI resource associated with a slot having more than 14 symbols and receiving, from the UE, a report including an indication of a measured CLI on the CLI resource.

An apparatus for wireless communication at a base station in a wireless communication system is described. The apparatus may include a processor, memory coupled with the processor, and instructions stored in the memory. The instructions may be executable by the processor to cause the apparatus to transmit, to a UE, signaling indicating a configuration including a resource allocation of a CLI resource associated with a slot having more than 14 symbols and receive, from the UE, a report including an indication of a measured CLI on the CLI resource.

Another apparatus for wireless communication at a base station in a wireless communication system is described. The apparatus may include means for transmitting, to a UE, signaling indicating a configuration including a resource allocation of a CLI resource associated with a slot having more than 14 symbols and means for receiving, from the UE, a report including an indication of a measured CLI on the CLI resource.

A non-transitory computer-readable medium storing code for wireless communication at a base station in a wireless communication system is described. The code may include instructions executable by a processor to transmit, to a UE, signaling indicating a configuration including a resource allocation of a CLI resource associated with a slot having more than 14 symbols and receive, from the UE, a report including an indication of a measured CLI on the CLI resource.

Some examples of the method, apparatuses, and non-transitory computer-readable medium described herein may further include operations, features, means, or instructions for selecting a time division duplex configuration designating uplink symbols or downlink symbols, or both, for the slot based on the measured CLI on the CLI resource and transmitting, to the UE, the time division duplex configuration.

In some examples of the method, apparatuses, and non-transitory computer-readable medium described herein, the CLI resource crosses a slot boundary of the slot based on a reference subcarrier spacing of the CLI resource.

In some examples of the method, apparatuses, and non-transitory computer-readable medium described herein, the CLI resource may be within a slot boundary of the slot having the more than 14 symbols based on a reference subcarrier spacing of the CLI resource.

DETAILED DESCRIPTION

Figure 1:
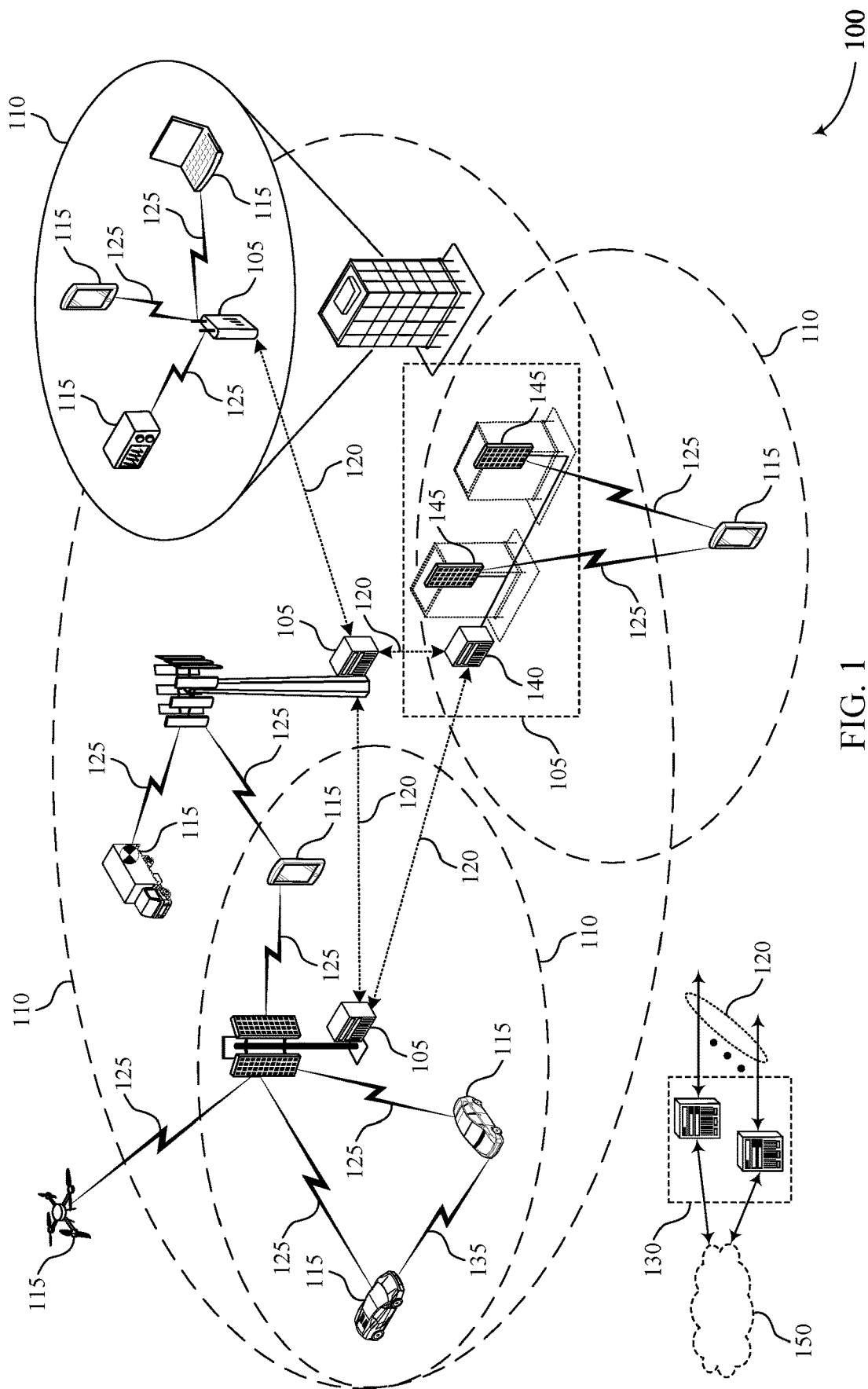
FIGS. 1 and 2 illustrate examples of wireless communications systems that support techniques for CLI measurements in accordance with aspects of the present disclosure.

A wireless communications system may include various communication devices, such as a UE and a base station, which may provide wireless communication services to the UE. For example, such a base station may be a next-generation NodeB (which may be referred to as a gNB) that may support multiple radio access technologies including 4G systems, such as 4G LTE, as well as 5G systems (which may be referred to as 5G NR). In some cases, in the wireless communications system, a UE may experience CLI while communicating with a base station. For example, if another UE is transmitting an uplink communication while the UE is attempting to receive a downlink communication from the base station, the uplink communication may interfere with the downlink communication such that the UE may be unable to successfully decode the downlink communication. To compensate for the CLI caused by the other UE, the base station may configure the UE to perform a CLI measurement.

The base station may allocate time and frequency resources for the UE to use to perform the CLI measurement. The allocated time and frequency resources may include one or more resources for measuring a power level of a reference signals, for example, a sounding reference signal (SRS), received from the other UE. Additionally or alternatively, the time and frequency resources may include one or more resources for measuring a total received power level. In some cases, the UE may compensate the downlink transmission from the base station based on the CLI measurement such that the UE may decode the downlink transmission with increased reliability. The UE may perform the CLI measurement based on a sub-carrier spacing (SCS) of the UE.

In some cases, an SCS of the UE may be different than an SCS of the other UE. As such, a symbol duration of the UE may be different from a symbol duration of the other UE. If, for example, the symbol duration of the other UE is longer than the symbol duration of the UE, a symbol used by the other UE to transmit an SRS may be longer than a symbol used by the UE to measure the SRS. As a result, the UE may measure a portion of the SRS. Hence, the CLI measurement of the UE may be inaccurate and the UE may be unable to effectively compensate the downlink transmission from the base station. Additionally or alternatively, the other UE may use a slot that has more than 14 symbols (e.g., a super-slot) for uplink transmissions. In some cases, however, the time and frequency resources allocated to the UE by the base station may result in the UE to performing measurements within a slot of 14 symbols. Thus, the UE may be unable to measure an SRS transmitted by the other UE outside a boundary of the slot. As such, the CLI measurement performed by the UE may be inaccurate and the UE may be unable to decode the downlink transmission from the base station.

To address the above shortcomings, various aspects of the present disclosure relate to the base station configuring the UE to perform the CLI measurement in a slot having a slot duration greater than 14 symbols. More specifically, the base station may configure the UE with a configuration via a radio resource control (RRC) message, a downlink control information (DCI) message, a medium access control (MAC)-control element (CE) message, or a combination thereof. The configuration may include a resource allocation for performing the CLI measurement in a slot having a slot duration greater than 14 symbols. As such, if the other UE uses a slot having a slot duration greater than 14 symbols to transmit an SRS, the UE may be able to measure all of the SRS based on the configuration and may obtain a more accurate measurement of the SRS as a result. Additionally or alternatively, the base station may configure the UE to perform the CLI measurement based on a reference SCS (e.g., an SCS of the other UE) instead of the SCS of the UE. Thus, if the other UE transmits an SRS using a longer symbol duration based on the reference SCS, the UE may measure the SRS using the same symbol duration and may be able to measure all of the SRS. Hence, the UE may obtain a more accurate CLI measurement and may be able to compensate for the CLI more effectively as a result.

The UE may transmit a measurement report to the base station based on performing the CLI measurement. The measurement report may include an indication of the CLI measurement. In some examples, the base station may configure a time division duplex (TDD) configuration of the UE based on receiving the measurement report from the UE. The TDD configuration may enable the UE to receive subsequent downlink communications from the base station with reduced CLI from the second UE.

Aspects of the present disclosure may be implemented to realize one or more of the following potential advantages or improvements, among others. The present disclosure may provide benefits and enhancements to the operation of a UE. For example, operations performed by the UE may provide improvements to uplink transmissions and downlink reception. By configuring the UE to support a slot duration having greater than 14 symbols, the UE may obtain a more accurate measurements, such as CLI measurement. Configuring the UE to support slot durations having greater than 14 symbols may also provide improvements in power savings for the UE. For example, the UE may increase battery life by providing efficient uplink transmissions in the wireless communications system based on mitigating CLI. Additionally, configuring the UE to perform CLI measurements in slot durations having greater than 14 symbols may also provide improvements in spectral efficiency based on increasing the reliability of communications.

Aspects of the disclosure are initially described in the context of wireless communications systems. Aspects of the disclosure are illustrated by and described with reference to slot format configurations, slot formats, slot configurations, and process flows. Aspects of the disclosure are further illustrated by and described with reference to apparatus diagrams, system diagrams, and flowcharts that relate to techniques for CLI measurements.

FIG. 1 illustrates an example of a wireless communications system 100 that supports techniques for CLI measurements in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a UE 115 may support wireless communications according to a slot format configuration, which may allocate a number of downlink symbols for downlink communications or uplink symbols for uplink communications, or both, within a slot. A slot may span a number of time and frequency resources. In some cases, a slot may span 14 symbols, which may include downlink symbols or uplink symbols, or a combination thereof, for various wireless communication operations. In the wireless communications system 100, a UE 115 may experience CLI while communicating with a base station 105. For example, if another UE 115 (e.g., an inter-cell UE or an intra-cell UE) is transmitting an uplink communication while the UE 115 is attempting to receive a downlink communication from the base station 105, the uplink communication may interfere with the downlink communication such that the UE 115 may be unable to successfully decode the downlink communication.

To compensate for the CLI caused by the other UE 115, the base station 105 may configure the UE 115 to perform a CLI measurement. For example, the base station 105 may allocate time and frequency resources for the UE 115 to use to perform the CLI measurement. The allocated time and frequency resources may include one or more resources for measuring a power level of an SRS received from the other UE 115. Additionally or alternatively, the time and frequency resources may include one or more resources for measuring a total received power level. In some cases, the UE 115 may compensate the downlink transmission from the base station 105 based on the CLI measurement such that the UE 115 may decode the downlink transmission with increased reliability.

The UE 115 may perform the CLI measurement based on an SCS of the UE 115. In some cases, the SCS of the UE 115 may be different than an SCS of the other UE 115 (e.g., an interfering UE). As such, a symbol duration of the UE 115 may be different from a symbol duration of the other UE 115. If, for example, the symbol duration of the other UE 115 is longer than the symbol duration of the UE 115, a symbol used by the other UE 115 (e.g., an interfering UE) to transmit an SRS may be longer than a symbol used by the UE 115 to measure the SRS. As a result, the UE 115 may measure a portion of the SRS. Hence, the CLI measurement of the UE 115 may be inaccurate and the UE 115 may be unable to effectively compensate the downlink transmission from the base station 105.

To help mitigate such CLI, various aspects of the present disclosure relate to the base station 105 configuring the UE 115 to perform the CLI measurement in a slot. More specifically, the base station 105 may configure the UE 115 with a configuration via an RRC message, a DCI message, a MAC-CE message, or a combination thereof. The configuration may include a resource allocation for performing the CLI measurement in a slot having a slot duration greater than 14 symbols (also referred to as a super-slot) as described herein. As such, if the other UE 115 uses a slot having a slot duration greater than 14 symbols to transmit an SRS, the UE 115 may be able to measure all of the SRS based on the configuration and may obtain a more accurate measurement of the SRS as a result.

Additionally or alternatively, the base station 105 may configure the UE 115 to perform the CLI measurement based on a reference SCS (e.g., an SCS of the other UE 115) instead of the SCS of the UE 115. Thus, if the other UE 115 transmits an SRS using a longer symbol duration based on the reference SCS, the UE 115 may measure the SRS using the same symbol duration and may be able to measure all of the SRS. Hence, the UE 115 may obtain a more accurate CLI measurement and may be able to compensate for the CLI more effectively as a result. Additionally, capabilities of the UE 115 may be defined to support different options for measuring CLI.

The UE 115 may transmit a measurement report to the base station 105 based on performing the CLI measurement. For example, the UE 115 may transmit, to the base station 105, the measurement report as part of uplink control information (UCI). The measurement report may include an indication of the CLI measurement. In some examples, the base station 105 may configure a TDD configuration of the UE 115 based on receiving the measurement report from the UE 115. The TDD configuration may enable the UE 115 to receive subsequent downlink communications from the base station 105 with reduced CLI from the second UE 115. For example, the base station 105 may reallocate time and frequency resources for the UE 115 to use for wireless communications in the wireless communications system 100 based on the CLI measurement.

The wireless communications system 100 thus may enhance wireless communications while managing CLI. By configuring a UE 115 to support a slot having a slot duration greater than 14 symbols the UE 115 may reduce or mitigate CLI in the wireless communications system 100. As a result, the UE 115 may promote higher reliability and lower latency wireless communications, among other benefits.

Figure 2:
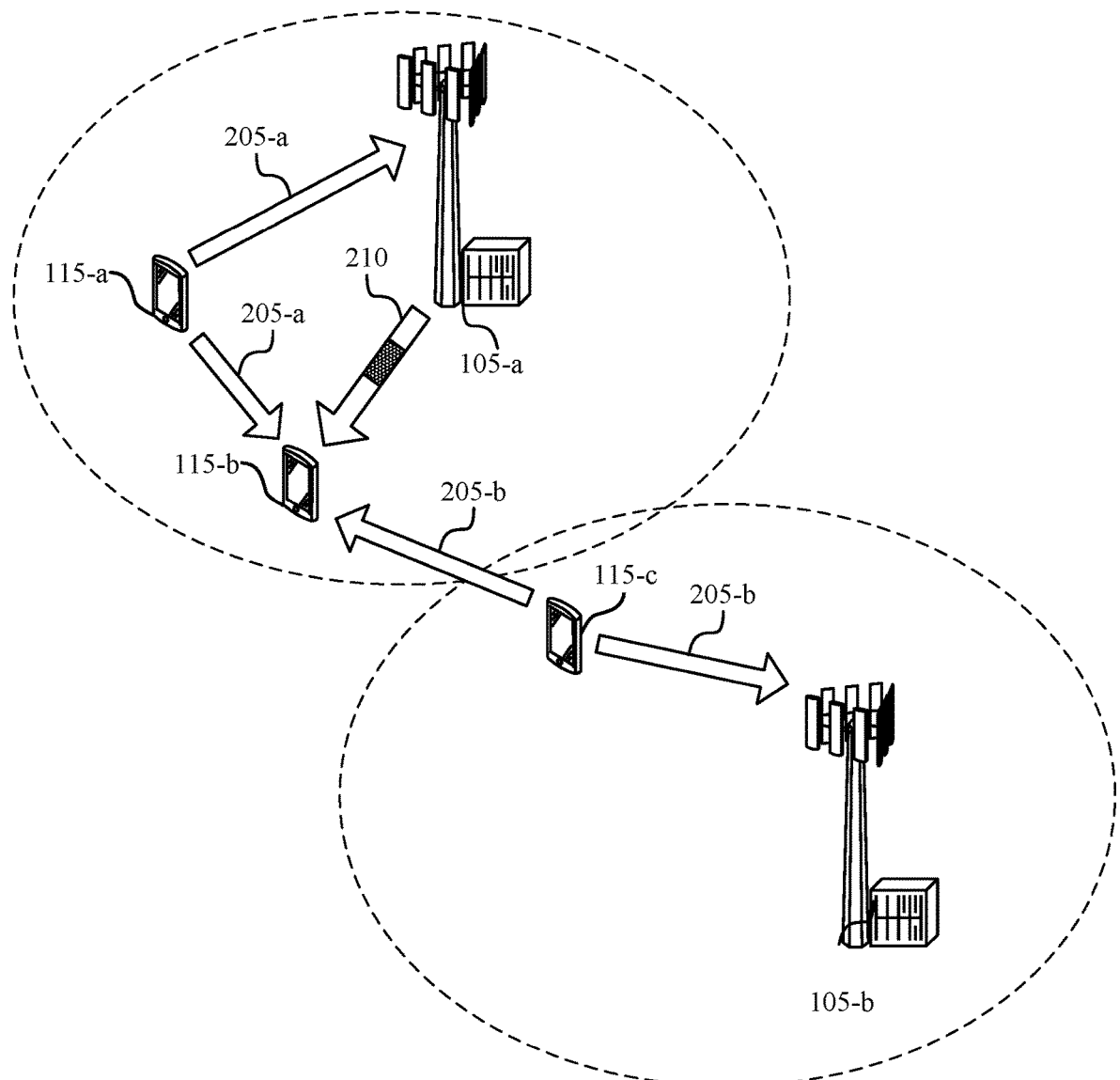

FIG. 2 illustrates an example of a wireless communications system 200 that supports techniques for CLI measurements in accordance with aspects of the present disclosure. The wireless communications system 200 may implement aspects of the wireless communications system 100 or may be implemented by aspects of the wireless communications system 100. The wireless communications system 200 may include a base station 105-*a*, a UE 115-*a*, and a UE 115-*b* within a geographic coverage area 110-*a*. Additionally, the wireless communications system 200 may include a base station 105-*b* and a UE 115-*c* within a geographic coverage area 110-*b*. The base stations 105 and the UEs 115 may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for higher reliability and lower latency wireless communications, among other benefits.

In the example of FIG. 2, the base station 105-*a* may transmit a configuration to the UE 115-*b* for performing a CLI measurement in the wireless communications system 200. In some cases, the UE 115-*b* may experience CLI while communicating with the base station 105-*a*. For example, if the UE 115-*a* transmits an uplink communication 205-*a* to the base station 105-*a* while the UE 115-*b* is attempting to receive a downlink communication 210 from the base station 105-*a*, the uplink communication 205-*a* may prevent the UE 115-*b* from successfully receiving the downlink communication 210. More specifically, an uplink symbol of the uplink communication 205-*a* may collide with a downlink symbol of the downlink communication 210, as described herein. Such collisions may be referred to as intra-cell CLI, because the UEs 115-*a* and 115-*b* are in the same coverage area 110-*a* (e.g., a cell of the base station 105-*a*). Additionally or alternatively, an uplink communication 205-*b* of the UE 115-*c* may interfere with the downlink communication 210. Such interference may be referred to as inter-cell CLI because the UE 115-*b* and 115-*c* are in different coverage areas 110 (e.g., cells of the base stations 105-*a* and 105-*b*). That is, the UE 115-*b* is within the coverage area 110-*a* associated with the base station 105-*a*, while the UE 115-*c* is within the coverage area 110-*b* associated with the base station 105-*b*.

The base station 105-*a* may allocate time and frequency resources to the UE 115-*b* (e.g., the victim UE) for measuring CLI caused by an aggressor UE (e.g., the UE 115-*a* or the UE 115-*c*). The allocated time and frequency resources may include a set of SRS resources and a set of CLI resources. The UE 115-*b* may use the allocated time and frequency resources to measure a set of CLI measurement metrics associated with the aggressor UE. For example, the UE 115-*b* may use the set of SRS resources to measure an SRS-reference signal received power (RSRP) and may use the set of CLI resources to measure a CLI received signal strength indicator (RSSI). The SRS-RSRP may indicate a linear average of power contributions for an SRS received from the aggressor UE. The UE 115-*b* may measure the SRS-RSRP over resource elements within a measurement frequency bandwidth in configured measurement occasions corresponding to the set of SRS resources. A measurement occasion may be a designated location within a symbol of a slot included in the set of SRS resources. The UE 115-*b* may measure the SRS-RSRP during one or more measurement occasions. The CLI RSSI may indicate a linear average of total received power observed by the UE 115-*b* in the set of CLI resources. The UE 115-*b* may measure the CLI RSSI in specific symbols of resource elements within a measurement frequency bandwidth corresponding to the set of CLI resources.

In some cases, the UE 115-*b* may perform a resource mapping determine one or more resources for measuring the SRS-RSRP. The resource mapping may include a symbol location of an SRS resource (e.g., a resource from the set of SRS resources) within a slot. That is, the symbol location of the SRS resource may be within a boundary of the slot. The resource mapping may also include a starting symbol position, a symbol range, or both for the SRS resource. In some cases the symbol range may include a last symbol position and a second-to-last symbol position for the SRS resource. Additionally or alternatively, the resource mapping may include a number of symbols per the SRS resource (e.g., N=1, 2, or 4 symbols per the SRS resource) and a repetition factor (e.g., r=1, 2, or 4) that is configured by a higher layer parameter (e.g., resourceMapping) in the SRS resource.

The UE 115-*b* may measure the SRS-RSRP and the CLI RSSI in an active BWP of the UE 115-*b* while the UE 115-*b* is in a connected state (e.g., an RRC CONNECTED) with the base station 105-*a*. Accordingly, the UE 115-*b* may use an SCS associated with the active BWP of the UE 115-*b* to measure the SRS-RSRP and the CLI RSSI. In some cases, the UE 115-*b* may measure the SRS-RSRP and the CLI RSSI for a number of symbols indicated that may be, for example, indicated by the base station. The UE 115-*b* may determine a symbol duration for the number of symbols based on the active BWP SCS of the UE 115-*b*. As such, the UE 115-*b* may measure the SRS-RSRP and the CLI-RSSI in the allocated time and frequency resources for a duration that corresponds to the active BWP SCS of the UE 115-*b*.

In some cases, the active BWP SCS of the UE 115-*b* may be different from an SCS of the aggressor UE. For example, the active BWP SCS of the UE 115-*b* may be different from an SCS used by the UE 115-*a* to transmit the uplink communication 205-*a*. Accordingly, a symbol duration used by the UE 115-*b* to measure CLI caused by the uplink communication 205-*a* may be different from a symbol duration used by the UE 115-*a* to transmit the uplink communication 205-*a*. In some cases, the symbol duration used by the UE 115-*a* may be longer than the symbol duration used by the UE 115-*b*. Thus, a duration of the CLI measurement may be shorter than a duration of the uplink communication 205-*a*. As a result, the UE 115-*b* may measure a portion of the uplink communication 205-*a* and may obtain an inaccurate measurement of the CLI caused by the uplink communication 205-*a*.

As an illustrative example, the UE 115-*c* (e.g., the aggressor UE) may use an SCS (e.g., 30 kHz) and may transmit the uplink communication 205-*b* with a symbol duration (e.g., 33.3 µs) that corresponds to the SCS of the UE 115-*c*. Meanwhile, the UE 115-*b* may use an active BWP SCS (e.g., 60 kHz) that is different from the SCS of the UE 115-*c*. As such, the UE 115-*b* may use a symbol duration (e.g., 16.7 µs) that corresponds to the active BWP SCS to measure the uplink communication 205-*b* on the allocated time and frequency resources. If the active BWP SCS of the UE 115-*b* is higher than the SCS of the UE 115-*c*, the symbol duration used by the UE 115-*b* may be shorter than the symbol duration used by the UE 115-*c*. Thus, if the UE 115-*c* transmits the uplink communication 205-*b* for a duration that corresponds to the symbol duration of the UE 115-*c* and the UE 115-*b* attempts to measure the uplink communication 205-*b* for a duration that corresponds to the symbol duration of the UE 115-*b*, the UE 115-*b* may be unable to measure all of the uplink communication 205-*b*. That is, the uplink communication 205-*b* may exceed a slot boundary of the allocated time and frequency resources.

In some cases, the set of CLI resources may be associated with a reference SCS. The reference SCS may correspond to an SCS of an aggressor UE (e.g., the UE 115-*a* or the UE 115-*c*). Alternatively, the reference SCS may not correspond to an SCS of an aggressor UE. In some cases, however, the UE 115-*b* may measure a CLI-RSSI on the set of CLI resources using the active BWP SCS of the UE 115-*b* even if the reference SCS of the set of CLI resources is different from the active BWP SCS of the UE 115-*b*. That is, the UE 115-*b* may measure a CLI-RSSI on the set of CLI resources regardless of the reference SCS. The base station 105-*a* may configure the UE 115-*b* with a set of criteria for measuring the CLI-RSSI if the reference SCS is different from the active BWP SCS of the UE 115-*b*.

For example, if the reference SCS (e.g., 15 kHz) is lower than the active BWP SCS of the UE 115-*b* (e.g., 30 kHz), the UE 115-*b* may be configured with a set of parameters (e.g., startPRB and nrofPRBs) that are multiples of the active BWP SCS of the UE 115-*b* divided by the reference SCS. As such, there may be no partial resource block configuration. The UE 115-*b* may also be configured with a second set of parameters (e.g., startPosition and nrofSymbols) such that the set of CLI resources is within a slot boundary of the active BWP SCS of the UE 115-*b*. Hence, there may be no cross-slot measurement performed by the UE 115-*b*. Alternatively, if the reference SCS (e.g., 30 kHz) is higher than the active downlink BWP SCS (e.g., 15 kHz) of the UE 115-*b*, the second set of parameters may be configured as multiples of the reference SCS divided by the active BWP SCS of the UE 115-*b* such that there is no partial symbol configuration. If, however, the UE 115-*b* is unable to use the set of CLI resources to measure a CLI RSSI according to the set of rules, the UE 115-*b* may refrain from using the set of CLI resources to measure a CLI RSSI.

In some cases, an aggressor UE (e.g., the UE 115-*a* or the UE 115-*c*) may transmit an uplink communication in a slot with more than 14 symbols (also referred to as a super-slot). For example, the UE 115-*a* may transmit the uplink communication 205-*a* in a slot with more than 14 symbols. The slot with more than 14 symbols may be a start and length indicator value (SLIV)-based slot 415-*a* or a slot-index-based slot 415-*b*, as described herein with reference to FIG. 4. In some cases, however, the allocated time and frequency resources may enable the UE 115-*b* to perform the CLI measurement in a slot of 14 symbols. That is, the UE 115-*b* may be unable to perform the CLI measurement across a slot boundary of the allocated time and frequency resources. As a result, the UE 115-*b* may be unable to measure some of the symbols in the uplink communication 205-*a*. Thus, the CLI measurement may be inaccurate and the UE 115-*b* may be unable to effectively mitigate the CLI caused by the uplink communication 205-*a*.

The wireless communications system 200 may support the base station 105-*a* configuring the UE 115-*b* with a configuration via an RRC message, a DCI message, a MAC-CE message, or a combination thereof. The configuration may include a resource allocation 220 and a reference SCS associated with the resource allocation 220, where the resource allocation 220 includes a set of SRS resources and a set of CLI resources for measuring CLI caused by an aggressor UE. The UE 115-*b* may use the configuration to perform a CLI measurement in a slot having a slot duration greater than 14 symbols (e.g., a super-slot). More specifically, the UE 115-*b* may use the set of SRS resources to measure an SRS-RSRP in a slot having a slot duration greater than 14 symbols and may use the set of CLI resources to measure a CLI-RSSI in the slot having a slot duration greater than 14 symbols. As such, the UE 115-*b* may measure the CLI caused by the aggressor UE even if the aggressor UE uses another slot having a slot duration greater than 14 symbols for uplink transmissions. The UE 115-*b* may determine the CLI caused by the aggressor UE based on performing the CLI measurement in the slot having a slot duration greater than 14 symbols and may transmit a measurement report to the base station 105-*a*, where the measurement report indicates the determined CLI.

As an illustrative example, if the UE 115-*a* uses a slot having a slot duration greater than 14 symbols to transmit the uplink communication 205-*a*, the UE 115-*b* may use another slot having a slot duration greater than 14 symbols to measure CLI caused by the uplink communication 205-*a*. More specifically, the UE 115-*b* may measure an SRS-RSRP on the set of SRS resources in the other slot having a slot duration greater than 14 symbols and may measure a CLI-RSSI on the set of CLI resources in the other slot having a slot duration greater than 14 symbols. That is, the set of SRS resources and the set of CLI resources may be configured across a slot (e.g., a slot with 14 symbols) of the UE 115-*b* but within the other slot having a slot duration greater than 14 symbols used by the UE 115-*b*. In such examples, the UE 115-*b* may measure an SRS associated with the uplink communication 205-*a* if symbols from an SRS measurement occasion are confined within the other slot having a slot duration greater than 14 symbols of the UE 115-*b*. Thus, the UE 115-*b* may obtain a more accurate measurement of the CLI caused by the uplink communication 205-*a*.

In some examples, the UE 115-*b* may perform the CLI measurement based on the reference SCS rather than the active BWP SCS of the UE 115-*b*. The reference SCS may correspond to an SCS of the aggressor UE. As such, the UE 115-*b* may obtain an accurate CLI measurement for the aggressor UE even if the active BWP SCS of the UE 115-*b* is different from the SCS of the aggressor UE. Accordingly, when performing a cross-link measurement for the aggressor UE, the UE 115-*b* may use a symbol duration that corresponds to the SCS of the aggressor UE. For example, if the UE 115-*c* transmits the uplink communication 205-*b* with a symbol duration that corresponds to an SCS of the UE 115-*c*, the UE 115-*b* may use the same symbol duration to measure CLI caused by the uplink communication 205-*b*. As a result, the UE 115-*b* may measure all of the uplink communication 205-*b* and may obtain an accurate CLI measurement for the UE 115-*c*.

In some examples, the UE 115-*b* may be able to obtain an accurate CLI measurement for the aggressor UE for any combination of slot size and SCS. For example, if the reference SCS is the same as the active BWP SCS of the UE 115-*b* and the aggressor UE uses a slot having a slot duration greater than 14 symbols to transmit an uplink communication that causes CLI at the UE 115-*b*, the UE 115-*b* may use a slot having a slot duration greater than 14 symbols to measure the CLI caused by the uplink communication. That is, the UE 115-*b* may use the resource allocation 220 to the measure CLI across a slot boundary (e.g., a slot boundary of a slot with 14 or fewer symbols) based on the reference SCS. For example, if an SCS of the UE 115-*a* is the same as the active BWP SCS of the UE 115-*b* and the UE 115-*a* uses a slot having a slot duration greater than 14 symbols to transmit the uplink communication 205-*a*, the UE 115-*b* may use another slot having a slot duration greater than 14 symbols to measure CLI caused by the uplink communication 205-*a*. In some examples, the UE 115-*b* may determine that the UE 115-*a* is transmitting the uplink communication 205-*a* in a slot having a slot duration greater than 14 symbols based on the reference SCS.

Alternatively, if the reference SCS is shorter than the active BWP SCS of the UE 115-*b*, a slot of the aggressor UE may correspond to multiple slots of the UE 115-*b*. In such examples, the UE 115-*b* may perform the CLI measurement based on the reference SCS instead of the active BWP SCS of the UE 115-*b*. In some examples, the UE 115-*b* may also perform the CLI measurement in a slot having a slot duration greater than 14 symbols. That is, the UE 115-*b* may perform the CLI measurement within the slot having a slot duration greater than 14 symbols based on the reference SCS. For example, if the reference SCS (e.g., an SCS of the UE 115-*c*) is shorter than the active BWP SCS of the UE 115-*b*, a slot of the UE 115-*c* may correspond to multiple slots of the UE 115-*b*. In such examples, the UE 115-*b* may perform the CLI measurement on the resource allocation 220 if multiple slots overlapping with the resource allocation 220 (e.g., slots that overlap with the set of CLI resources in a time domain, a frequency domain, or both) are within the same slot having a slot duration greater than 14 symbols used by the UE 115-*b*.

In some examples, the reference SCS may be shorter than the active BWP SCS of the UE 115-*b* and the aggressor UE may transmit an uplink communication in a slot having a slot duration greater than 14 symbols. In such examples, the UE 115-*b* may use a slot having a slot duration greater than 14 symbols to perform the CLI measurement based on the reference SCS. Thus, the UE 115-*b* may perform the CLI measurement across a slot boundary (e.g., a boundary of a slot with 14 or fewer symbols) based on the reference SCS. In such examples, the UE 115-*b* may perform the CLI measurement if multiple slots overlapping with the resource allocation 220 (e.g., the set of CLI resources) are within the same slot having a slot duration greater than 14 symbols used the UE 115-*b*.

The wireless communications system 200 may thus enhance wireless communications while managing CLI. By configuring the UE 115-*b* to support a slot having a slot duration greater than 14 symbols, the UE 115-*b* may reduce or mitigate CLI in the wireless communications system 200. As a result, the UE 115-*b* may promote higher reliability, lower latency, and improved spectral efficiency among other benefits.

Figure 3:
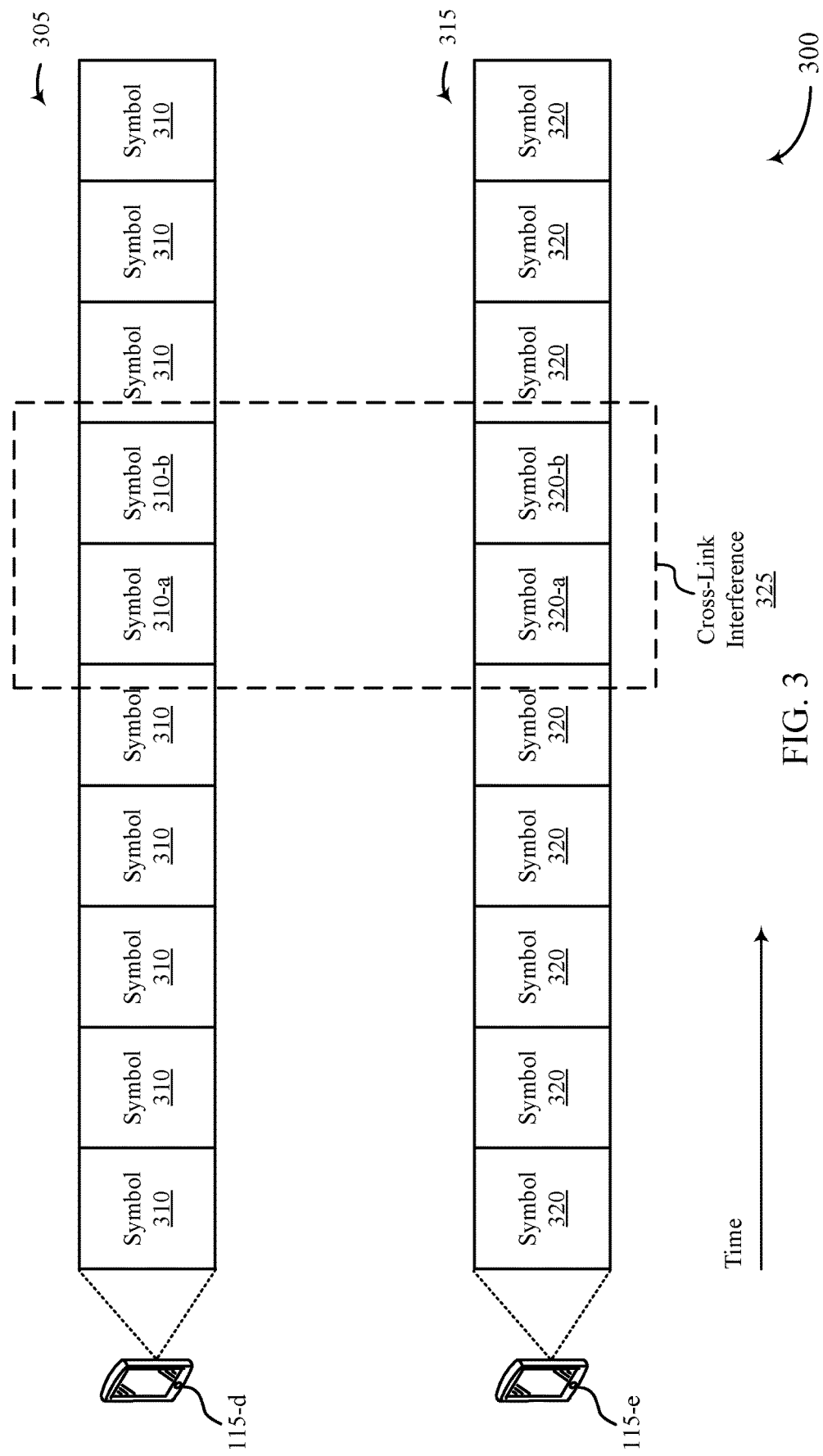
FIGS. 3 through 5 illustrate examples of slot configurations that support techniques for CLI measurements in accordance with aspects of the present disclosure.

FIG. 3 illustrates an example of a slot configuration 300 that supports techniques for CLI measurements in accordance with aspects of the present disclosure. The slot configuration 300 may implement or be implemented by aspects of the wireless communications systems 100 and 200 or may implement aspects of the wireless communications systems 100 and 200 as described with reference to FIGS. 1 and 2, respectively. The slot configuration may include a slot 305 and a slot 315, which may be based on the slot configuration 300. The slot 305 may include a number of symbols 310, which may be downlink symbols, uplink symbols, flexible symbols, or any combination thereof. Likewise, the slot 315 may include a number of symbols 320, which may be downlink symbols, uplink symbols, flexible symbols, or any combination thereof. A flexible symbol may be used for downlink communications, uplink communications, or both. For example, a flexible symbol may be configured (e.g., via an RRC configuration, or the like) for downlink communications, uplink communications, or both. In some examples, the slots 305 or the slot 315, or both, may have 14 or fewer symbols. The slot 305 may be associated with the UE 115-*d* and the slot 315 may be associated with the UE 115-*e*. In some cases, the UE 115-*d* may experience CLI 325, which may occur over a portion (e.g., symbols 310-*a* and 310-*b*) of the slot 315. Similarly, the UE 115-*e* may experience CLI 325 over a portion (e.g., symbols 320-*a* and 320-*b*) of the slot 315.

In some cases, the UE 115-*d* and the UE 115-*e* may experience CLI 325 based on having different TDD configurations. If the UE 115-*d* and the UE 115-*e* are in the same cell (e.g., intra-cell), the UE 115-*d* and the UE 115-*e* may be configured with different UE-specific dynamic TDD uplink and downlink configurations. Alternatively, if the UE 115-*d* and the UE 115-*e* are in different cells (e.g., inter-cell), the UE 115-*d* and the UE 115-*e* may be configured with different semi-static TDD uplink and downlink configurations. As an illustrative example, a TDD configuration of the UE 115-*d* may designate the symbol 310-*a* and the symbol 310-*b* as uplink symbols and a TDD configuration of the UE 115-*e* may designate the symbol 320-*a* and the symbol 320-*b* as downlink symbols. As such, the UE 115-*d* (e.g., the aggressor UE) may transmit an uplink communication while the UE 115-*e* (e.g., the victim UE) is attempting to receive a downlink communication. In some cases, the uplink communication of the UE 115-*d* may prevent the UE 115-*e* from receiving the downlink communication. For example, an uplink symbol of the UE 115-*d* (e.g., the symbol 310-*a*) may collide with a downlink symbol of the UE 115-*e* (e.g., the symbol 320-*a*). Such collisions may cause the CLI 325 at the UE 115-*e*.

In some cases, if the UE 115-*d* causes CLI 325 at the UE 115-*e*, the UE 115-*e* may perform a CLI measurement to determine the CLI 325. A base station 105 may allocate time and frequency resources for the UE 115-*e* to perform the CLI measurement. The allocated time and frequency resources may include one or more resources for measuring a power level of an SRS received from the UE 115-*d*. Additionally or alternatively, the time and frequency resources may include one or more resources for measuring a total received power level at the UE 115-*e*. The UE 115-*e* may perform the CLI measurement on the time and frequency resources according to an SCS of the UE 115-*e*.

In some cases, an SCS of the UE 115-*d* may be different from an SCS of the UE 115-*e*. As such, a symbol duration of the UE 115-*d* may be different from a symbol duration of the UE 115-*e*. If, for example, the symbol duration of the UE 115-*d* is longer than the symbol duration of the UE 115-*e*, a symbol 310 used by the UE 115-*d* to transmit an SRS may be longer than a symbol used by the UE 115-*e* to measure the SRS. As a result, the UE 115-*e* may measure a portion of the SRS. The CLI measurement of the UE 115-*e* may be inaccurate and the UE 115-*e* may be unable to effectively mitigate the CLI 325. Additionally or alternatively, the UE 115-*d* may use a slot with more than 14 symbols for uplink transmissions. In some cases, the UE 115-*e* may perform the CLI measurement in a slot with 14 symbols. Thus, the UE 115-*e* may be unable to measure an SRS of the UE 115-*d* if the UE 115-*d* transmits the SRS outside a boundary of the slot. As such, the CLI measurement may be inaccurate and the UE 115-*e* may be unable to effectively mitigate the CLI 325.

The UE 115-*e* may be configured with a configuration via an RRC message, a DCI message, a MAC-CE message, or a combination thereof. The configuration may include time and frequency resources allocated to the UE 115-*e* for performing the CLI measurement in a slot having a slot duration greater than 14 symbols. That is, the UE 115-*e* may perform the CLI measurement in more than 14 symbols. As such, if the UE 115-*d* uses a slot having a slot duration greater than 14 symbols, the UE 115-*e* may be able to measure all of the CLI caused by the UE 115-*d* in the slot having a slot duration greater than 14 symbols. Additionally or alternatively, the UE 115-*e* may be configured to perform the CLI measurement based on a reference SCS (e.g., the SCS of the UE 115-*d*) rather than the SCS of the UE 115-*e*. Thus, if the UE 115-*d* uses a longer symbol duration to transmit an uplink communication (e.g., based on the reference SCS), the UE 115-*e* may use the same symbol duration to perform the CLI measurement. As a result, the UE 115-*e* may obtain a more accurate CLI measurement and may be able to mitigate the CLI 325 more effectively.

Figure 4:
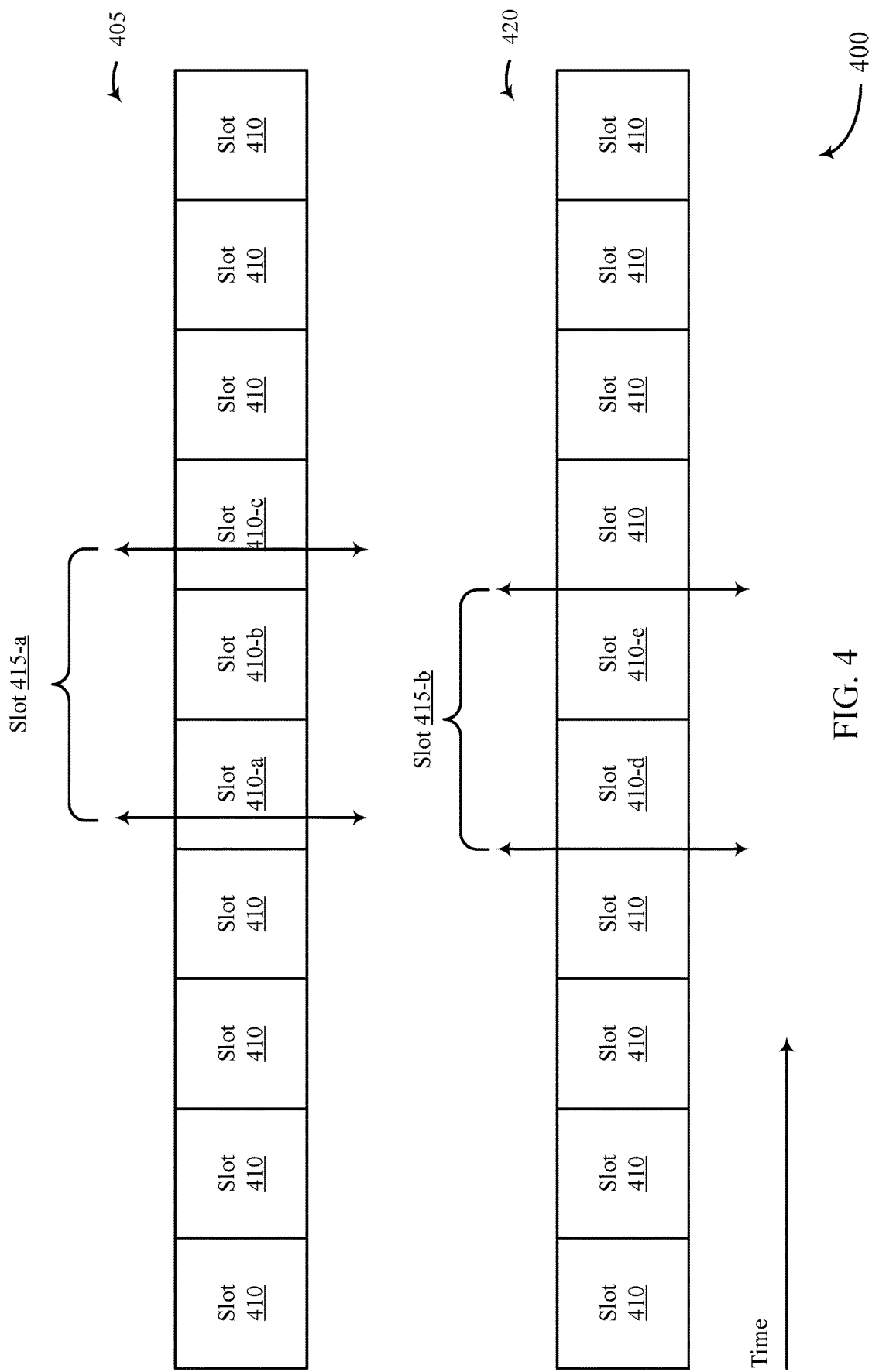

FIG. 4 illustrates an example of a slot configuration 400 that supports techniques for CLI measurements in accordance with aspects of the present disclosure. The slot configuration 400 may be implemented by aspects of the wireless communications systems 100 and 200 or may implement aspects of the wireless communications systems 100 and 200 as described with reference to FIGS. 1 and 2, respectively. The slot configuration 400 may include a set of slots 405 and a set of slots 420. The set of slots 405 and the set of slots 420 may each include one or more slots 410. The slots 410 may each have 14 symbols. The slot configuration 400 may also include an SLIV-based slot 415-*a* and a slot-index-based slot 415-*b*. In some examples, the slot-index-based slot 415-*b* may be equivalently referred to as a slot-fusion-based slot 415-*b*. The SLIV-based slot 415-*a* and the slot-index-based slot 415-*b* may have more than 14 symbols (e.g., OFDM symbols) and may span multiple contiguous slots (e.g., OFDM time slots). In some examples, a UE 115 may use the SLIV-based slot 415-*a*, or the slot-index-based slot 415-*b*, or both, to measure CLI at the UE 115.

In some cases, the UE may use a slot 415 (e.g., a super-slot as described herein) to improve repetition handling at slot boundaries, multi-slot transport block (TB) processing, cross-slot channel estimation, SRS transmissions across slots 410 (e.g., to increase the time duration and processing gain of SRS), or a combination thereof. Such improvements may be referred to as enhanced slot aggregation and may be a result of using a larger slot (e.g., a slot with more than 14 symbols) for uplink transmissions, downlink transmissions, or both. Utilizing the slot 415 may preserve scheduling structures associated with slots 410 (e.g., slots with 14 or fewer symbols), thereby maintaining scheduling flexibility while supporting enhanced slot aggregation techniques. Additionally, utilizing a slot 415 may improve channel estimation based on leveraging multiple demodulation reference signal (DMRS) symbols, optimizing DMRS density, reducing DMRS overhead, or a combination thereof. The slots 415 may also support coding gain based on using larger TB sizes (e.g., for small resource block (RB) allocations). Thus, in comparison to using slots with 14 symbols, a UE may use the slots 415 with a higher coding rate. In addition, the slots 415 may support more efficient type B repetitions, as described herein with reference to FIG. 5. Further, some wireless communications systems may employ the slots 415 to enhance uplink coverage for UEs at a cell-edge.

In some cases, the UE may use an SLIV-based slot 415-*a*. The SLIV-based slot 415-*a* may be indicated based on a starting symbol (e.g., S) and a total slot duration (e.g., L). The starting symbol may be indicated relative to a start of the SLIV-based slot 415-*a*, and the total slot duration may be indicated as a number of consecutive symbols counting from the starting symbol. In some cases, the starting symbol and the total slot duration of the SLIV-based slot 415-*a* may be used to determine an SLIV index for the SLIV-based slot 415-*a*. More specifically, if the total slot duration satisfies a criteria (e.g., $(L-1) \le 7$), the SLIV index may be calculated according to a first equation (e.g., $SLIV=14 \cdot (L-1)+S$). Otherwise, the SLIV index may be calculated according to a second equation (e.g., $SLIV=14 \cdot (14-L+1)+(14-1-S)$), where the total slot duration and the starting symbol have a specific relationship (e.g., $0<L \le 14-S$). The total duration of the SLIV-based slot 415-*a* may exceed 14 symbols and the SLIV-based slot 415-*a* may cross slot boundaries. For example, the SLIV-based slot 415-*a* may include symbols from the slot 410-*a*, the slot 410-*b*, and the slot 410-*c*. As such, the SLIV-based slot 415-*a* may cross a slot boundary between the slots 410-*a* and 410-*b*. Similarly, the SLIV-based slot 415-*a* may cross a slot boundary between the slot 410-*b* and the slot 410-*c*.

In some other cases, the UE 115 may use a slot-index-based slot 415-*b*. The slot-index-based slot 415-*b* may include multiple contiguous slots and may be generated in a static or semi-static manner. That is, a set of contiguous slots may be grouped together to create the slot-index-based slot 415-*b*. For example, the slot-index-based slot 415-*b* may include the slot 410-*d* and the slot 410-*e*, which may be adjacent (e.g., contiguous) in a time domain. Although the slot-index-based slot 415-*b* is illustrated as including two contiguous slots (e.g., the slot 410-*d* and the slot 410-*e*), it is to be understood that the slot-index-based slot 415-*b* may include any number of contiguous slots.

With reference to FIG. 2, in some cases, an aggressor UE (e.g., a UE 115-*a* or a UE 115-*c*) may use a slot 415 to transmit an uplink transmission. In some cases, the uplink transmission may be a physical uplink shared channel (PUSCH) type A repetition or a PUSCH type B repetition. The uplink transmission may create CLI at a victim UE (e.g., a UE 115-*b*). For example, if the aggressor UE transmits the uplink transmission while the victim UE is attempting to receive a downlink transmission, an uplink symbol of the aggressor UE may collide with a downlink symbol of the victim UE. In some cases, the aggressor UE and the victim UE may be in different cells and may be configured with different TDD uplink and downlink slot format configurations that contribute to the CLI. The CLI may be caused by any uplink transmission from the aggressor UE. In some examples, the aggressor UE may transmit an uplink transmission in a slot 415 based on changing a PUSCH time domain resource allocation (TDRA) to enable the slot 415.

In some cases, a base station may configure the victim UE to perform a CLI measurement such that the victim UE may determine the CLI caused by the aggressor UE. However, the victim UE may be configured to perform the CLI measurement in a slot 410 with 14 symbols. That is, the victim UE may be unable to measure all of the CLI caused by the aggressor UE in a slot 415. As such, the CLI measured by the victim UE may be inaccurate. Thus, the victim UE may be unable to effectively compensate for the CLI and may receive the downlink transmission with reduced reliability.

The victim UE may receive a configuration from a base station via an RRC message, a DCI message, a MAC-CE message, or a combination thereof. The configuration may enable the victim UE to perform the CLI measurement in a slot 415 having a slot duration greater than 14 symbols. For example, the victim UE may perform the CLI measurement in an SLIV-based slot 415-*a*, a slot-index-based slot 415-*b*, or both. Thus, if the aggressor UE transmits an uplink communication in a slot 415 and the uplink communication causes CLI at the victim UE, the victim UE may perform the CLI measurement in another slot 415 such that the victim UE may measure all of the CLI caused by the aggressor UE in the slot 415.

Figure 5:
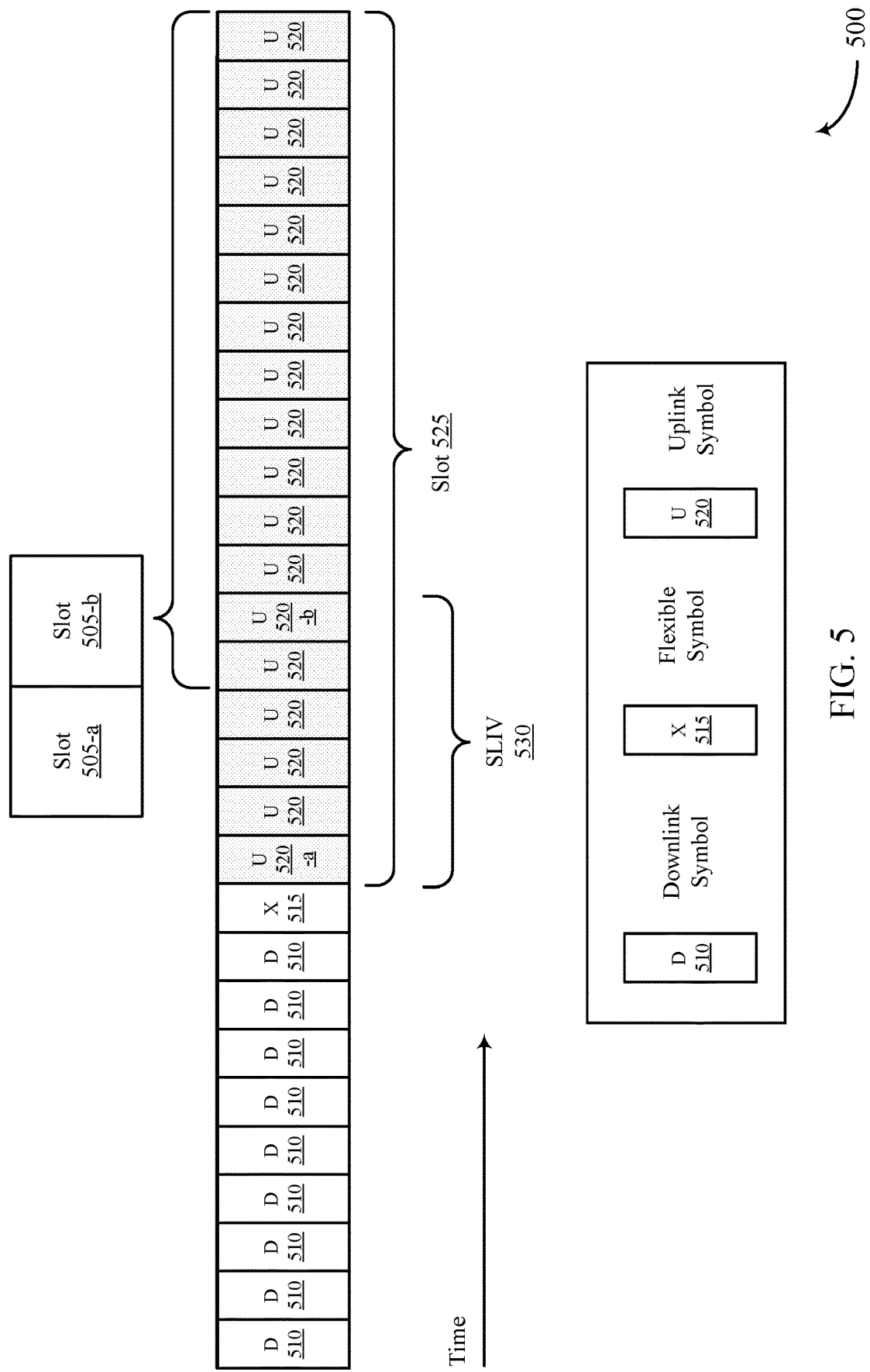

FIG. 5 illustrates an example of a slot configuration 500 that supports techniques for CLI measurements in accordance with aspects of the present disclosure. The slot configuration 500 may be implemented by aspects of the wireless communications systems 100 and 200 or may implement aspects of the wireless communications systems 100 and 200 as described with reference to FIGS. 1 and 2, respectively. The slot configuration 500 may include a slot 505-*a* and a slot 505-*b*, which may be examples of a slot 410 as described herein with reference to FIG. 4. The slot 505-*a* and the slot 505-*b* may include downlink symbols 510, flexible symbols 515, and uplink symbols 520, which may be examples of a symbol 310 or a symbol 320 as described herein with reference to FIG. 3. The slot configuration 500 may also include a slot 525, which may be an example of a SLIV-based slot 415-*a* or a slot-index-based slot 415-*b* as described herein with reference to FIG. 4. The slot 525 may be associated with a SLIV 530 and a repetition factor. In some examples, a victim UE may measure CLI caused by an aggressor UE transmitting an uplink communication in the slot 525.

In some cases, an aggressor UE may use the slot 525 to transmit an uplink communication in more than 14 uplink symbols 520 (e.g., which may be 14 contiguous uplink symbols). For example, the aggressor UE may transmit the uplink communication using a number of uplink symbols 520 from the slot 505-*b* and a number of symbols from the slot 505-*a*. As such, the uplink communication of the aggressor UE may cross a slot boundary between the slot 505-*a* and the slot 505-*b*. Although shown with 14 uplink symbols 520 from the slot 505-*b* and four symbols from the slot 505-*a*, it is to be understood that the slot 525 may include any number of uplink symbols 520, flexible symbols 515, or downlink symbols 510 from any number of slots 505.

In some cases, the aggressor UE may transmit the uplink communication according to a SLIV 530 and a repetition factor. In some cases, the uplink communication may be a PUSCH type A repetition or a PUSCH type B repetition. For example, the aggressor UE may transmit a PUSCH type A repetition in a first slot and may transmit additional repetitions of the PUSCH type A repetition in subsequent slots according to the repetition factor. As such, the PUSCH type A repetition may not cross a slot boundary. Alternatively, the aggressor UE may transmit multiple PUSCH type B repetitions in a single slot (e.g., using mini-slots) according to the repetition factor. The SLIV may indicate a starting symbol and a total duration for a first repetition of the uplink communication. For example, the aggressor UE may start the first repetition of the uplink communication at the uplink symbol 520-*a* and may transmit the first repetition of the uplink communication for a total duration of six contiguous uplink symbols 520 such that the first repetition of the uplink communication ends in the uplink symbol 520-*b*. In some examples, the aggressor UE may transmit subsequent repetitions of the uplink communication in the slot 525 according to the repetition factor. For example, if the repetition factor is three, the aggressor UE may transmit a second repetition of the uplink communication and a third repetition of the uplink communication after the first repetition of the uplink communication such that the slot 525 has a slot duration of 18 uplink symbols 520.

In some cases, the uplink communication of the aggressor UE in the slot 525 may cause CLI at a victim UE. More specifically, the uplink communication of the aggressor UE may prevent the victim UE from successfully receiving a downlink transmission. For example, an uplink symbol 520 (e.g., an interfering symbol) of the uplink communication may collide with a downlink symbol 510 of the victim UE, as described herein with reference to FIG. 3. The interfering symbol may prevent the victim UE from successfully receiving the downlink symbol 510. In some cases, a base station may configure the victim UE to perform a CLI measurement to determine the CLI caused by the aggressor UE. The victim UE may use the CLI measurement to mitigate the CLI caused by the aggressor UE by compensating the downlink communication for the CLI. However, the victim UE may be configured to perform the CLI measurement in a slot 505 with 14 symbols. Thus, the victim UE may be unable to accurately determine the CLI caused by the aggressor UE if the aggressor UE transmits the uplink communication in the slot 525 having a slot duration greater than 14 symbols.

In some examples, the victim UE may receive a configuration from a base station via an RRC message, a DCI message, or a MAC-CE message. The configuration may allocate time and frequency resources for the victim UE to perform a CLI measurement in another slot 525 (e.g., a slot 525 with the same number of symbols as the slot 525 used by the aggressor UE), as described herein with reference to FIG. 2. For example, the base station may allocate the other slot 525 to the victim UE such that the victim UE may measure all of the CLI caused by the uplink communication of the aggressor UE. As such, the victim UE may be able to accurately measure the CLI caused by the aggressor UE in the slot 525. Thus, the victim UE may be able to effectively mitigate the CLI and may receive the downlink communication with increased reliability.

Figure 6:
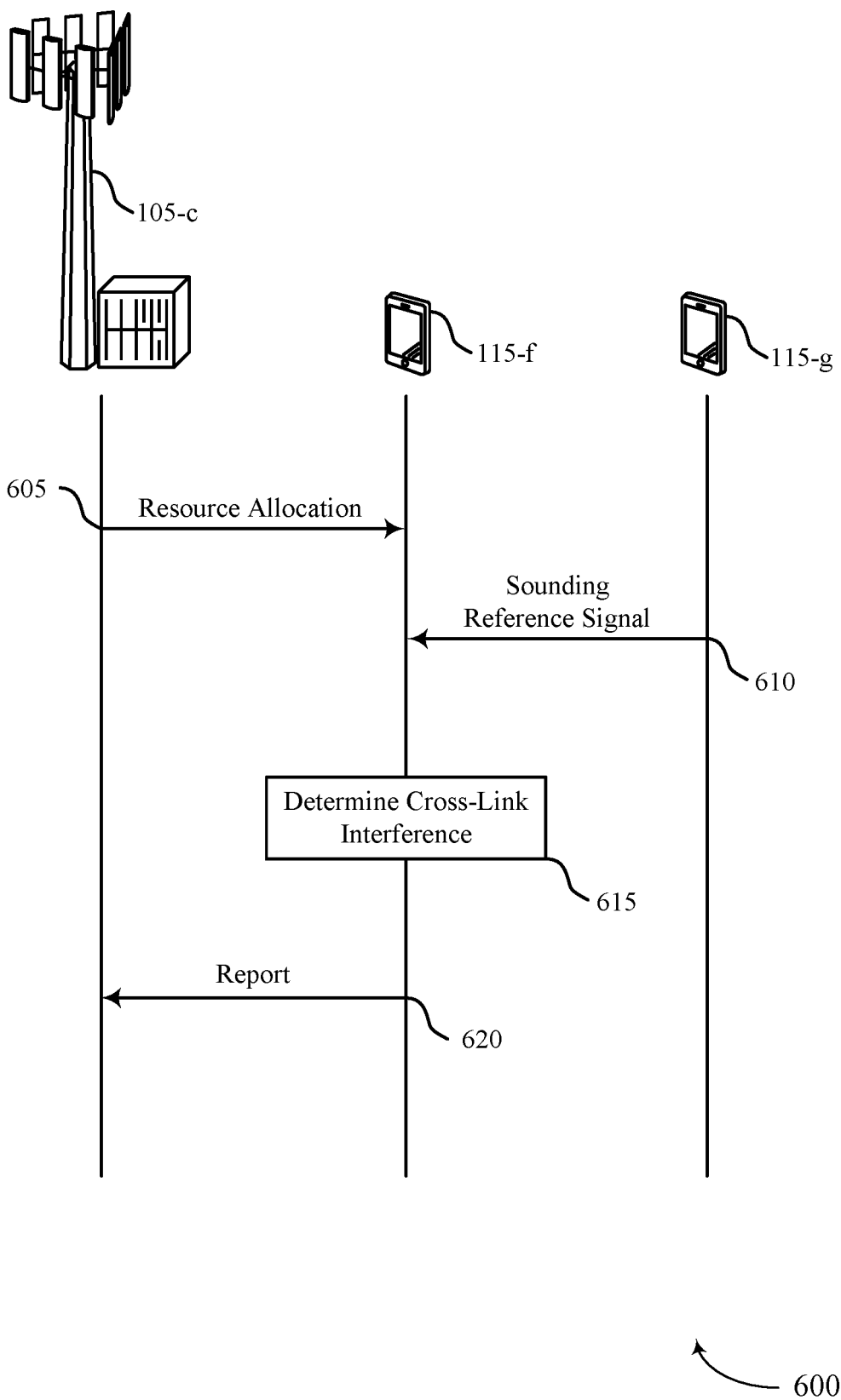
FIG. 6 illustrates an example of a process flow that supports techniques for CLI measurements in accordance with aspects of the present disclosure.

FIG. 6 illustrates an example of a process flow 600 that supports techniques for CLI measurements in accordance with aspects of the present disclosure. The process flow 600 may implement aspects of the wireless communications systems 100 and 200 or may be implemented by aspects of the wireless communications system 100 and 200 as described with reference to FIGS. 1 and 2, respectively. For example, the process flow 600 may be based on a configuration by a base station 105-c, which may be implemented by a UE 115-f or a UE 115-g. The base station 105-c, the UE 115-f and the UE 115-g may be examples of a base station 105 and a UE 115, as described with reference to FIGS. 1 and 2. In the following description of the process flow 600, the operations between the base station 105-c, the UE 115-f and the UE 115-g may be transmitted in a different order than the example order shown, or the operations performed by the base station 105-c, the UE 115-f and the UE 115-g may be performed in different orders or at different times. Some operations may also be omitted from the process flow 600, and other operations may be added to the process flow 600. In the example of FIG. 6, the base station 105-c may transmit a resource configuration to the UE 115-f, which may use the resource configuration to measure CLI caused by the UE 115-g.

At 605, the base station 105-c may transmit signaling to the UE 115-f that indicates a configuration. The configuration may be associated with a slot having a slot duration greater than 14 symbols and may include a resource allocation of an SRS resource, a resource allocation of a CLI resource, or both. The signaling may include an RRC message, a DCI message, a MAC-CE message, or a combination thereof. The UE 115-f may determine a number of SRS symbols associated with the SRS resource based on the configuration and may map the number of SRS symbols to a number of SRS symbol locations in the slot having a slot duration greater than 14 symbols. In some examples, the number of SRS symbols may be within a slot boundary associated with the slot having a slot duration greater than 14 symbols. Alternatively, the number of SRS symbols may cross a slot boundary associated with the slot having a slot duration greater than 14 symbols. The number of SRS symbols may include one SRS symbol per the SRS resource, two SRSs per the SRS resource, or four SRSs per the SRS resource. The number of SRS symbols may correspond to a repetition factor that indicates a repetition of SRS symbols in the slot having a slot duration greater than 14 symbols. In some examples, the slot having a slot duration greater than 14 symbols may include multiple contiguous slots in a time domain. In such examples, the number of SRS symbols may span one or more of the multiple contiguous slots.

At 610, the UE 115-f may receive an SRS from the UE 115-g on the SRS resource associated with the slot having a slot duration greater than 14 symbols. The UE 115-f may determine an active BWP SCS of the UE 115-f and may compare the active BWP SCS of the UE 115-f to a reference SCS of the SRS received from the UE 115-g. The UE 115-f may determine that the active BWP SCS is shorter, longer, or the same as the reference SCS based on the comparison.

In some examples, the UE 115-f may receive the SRS on the SRS resource in the slot having a slot duration greater than 14 symbols based on mapping the number of SRS symbols to the number of SRS symbol locations in the slot having a slot duration greater than 14 symbols.

At 615, the UE 115-f may determine a CLI associated with the UE 115-g based on measuring the SRS on the SRS resource during the slot having a slot duration greater than 14 symbols. In some examples, the UE 115-f may measure the SRS on the SRS resource based on identifying that the active BWP SCS of the UE 115-f is the same as the reference SCS of the SRS received from the UE 115-g. In some examples, the UE 115-f may measure an RSRP based on measuring the SRS on the SRS resource and may determine that the RSRP satisfies a threshold. In such examples, the UE 115-f may determine the CLI from the UE 115-g based on determining that the RSRP satisfies a threshold.

Additionally or alternatively, the UE 115-f may determine the CLI associated with the UE 115-g based on measuring an RSSI on the CLI resource during the slot having a slot duration greater than 14 symbols. In some examples, the UE 115-f may compare the active BWP SCS of the UE 115-f to an SCS of the CLI resource and may measure the RSSI on the CLI resource based on identifying that the active BWP SCS is the same as the reference SCS of the CLI resource. In some other examples, the UE 115-f may determine that the reference SCS of the CLI resource is shorter than the active BWP SCS of the UE 115-f and may measure the RSSI on the CLI resource based on determining that the reference SCS of the CLI resource is shorter than the active BWP SCS of the UE 115-f. The UE 115-f may determine that the CLI resource either crosses a slot boundary of the slot having a slot duration greater than 14 symbols or is within a slot boundary of the slot having a slot duration greater than 14 symbols based on the reference SCS of the CLI resource. In some examples, the UE may measure the RSSI on the CLI resource associated with the slot having a slot duration greater than 14 symbols based on identifying that the slot having a slot duration greater than 14 symbols includes two or more slots and that the slot having a slot duration greater than 14 symbols overlaps with the CLI resource.

At 620, the UE 115-f may transmit a report to the base station 105-c. The report may include an indication of the determined CLI associated with the UE 115-g. In some examples, the report may indicate a measured CLI on the CLI resource, a measured SRS on the SRS resource, or both. In some examples, the base station 105-c may determine a TDD configuration designating uplink symbols, downlink symbols, or both for the slot having a slot duration greater than 14 symbols. The base station 105-c may determine the TDD configuration based on measuring the CLI on the CLI resource, measuring the SRS on the SRS resource, or both. In some examples, the base station 105-c may transmit an indication of the TDD configuration to the UE 115-f. The UE 115-f may experience reduced CLI based on using the TDD configuration for subsequent communications with the base station 105-c.

Figure 7:
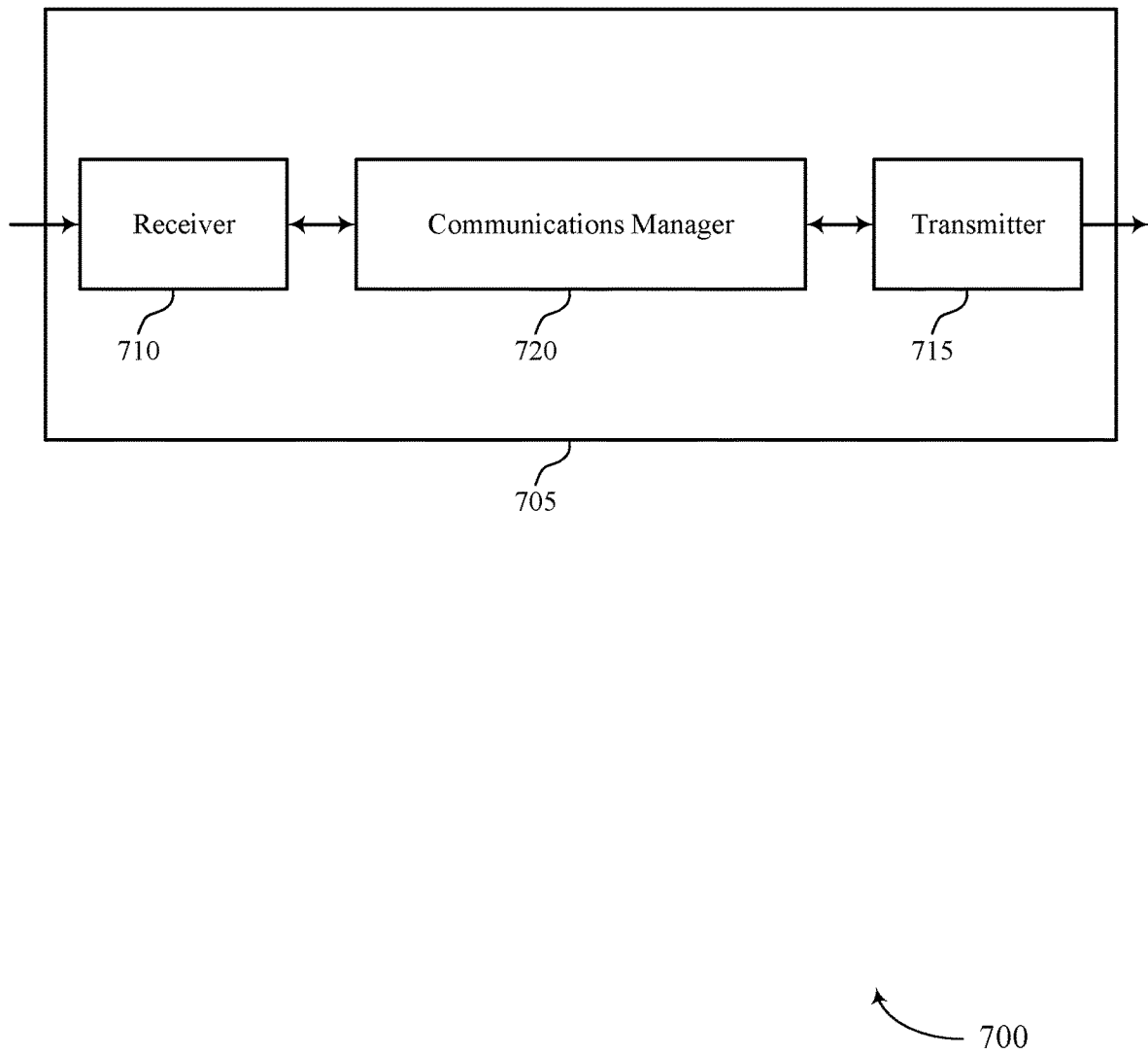
FIGS. 7 and 8 show block diagrams of devices that support techniques for CLI measurements in accordance with aspects of the present disclosure.

FIG. 7 shows a block diagram 700 of a device 705 that supports techniques for CLI measurements in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for CLI measurements). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for CLI measurements). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for CLI measurements as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710. The communications manager 720 may send information to the transmitter 715. The communications manager 720 be integrated in combination with the receiver 710, the transmitter 715, or both.

The communications manager 720 may receive information, transmit information, or perform various other operations as described herein.

The communications manager 720 may support wireless communication at a UE (e.g., the device 705) in accordance with examples as disclosed herein. For example, the communications manager 720 may be configured as or otherwise support a means for receiving signaling indicating a configuration including a resource allocation of an SRS resource associated with a slot having more than 14 symbols. The communications manager 720 may be configured as or otherwise support a means for receiving, from a second UE, an SRS on the SRS resource associated with the slot. The communications manager 720 may be configured as or otherwise support a means for determining a CLI associated with the second UE based on measuring the SRS on the SRS resource during the slot. The communications manager 720 may be configured as or otherwise support a means for transmitting a report including an indication of the CLI.

Additionally or alternatively, the communications manager 720 may support wireless communication at a UE (e.g., the device 705) in accordance with examples as disclosed herein. For example, the communications manager 720 may be configured as or otherwise support a means for receiving signaling indicating a configuration including a resource allocation of a CLI resource associated with a slot having more than 14 symbols. The communications manager 720 may be configured as or otherwise support a means for measuring an RSSI on the CLI resource based on a criterion. The communications manager 720 may be configured as or otherwise support a means for determining a CLI associated with a second UE based on the measuring of the RSSI on the CLI resource during the slot. The communications manager 720 may be configured as or otherwise support a means for transmitting a report including an indication of the CLI.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption and reduced processing based on using a slot with a slot duration greater than 14 symbols to perform CLI measurements. For example, the device 705 may reduce a number of retransmissions at the device 705 based on performing a CLI measurement in a slot with a slot duration greater than 14 symbols, thereby allowing the device 705 to enter a sleep mode for an increased time duration.

Figure 8:
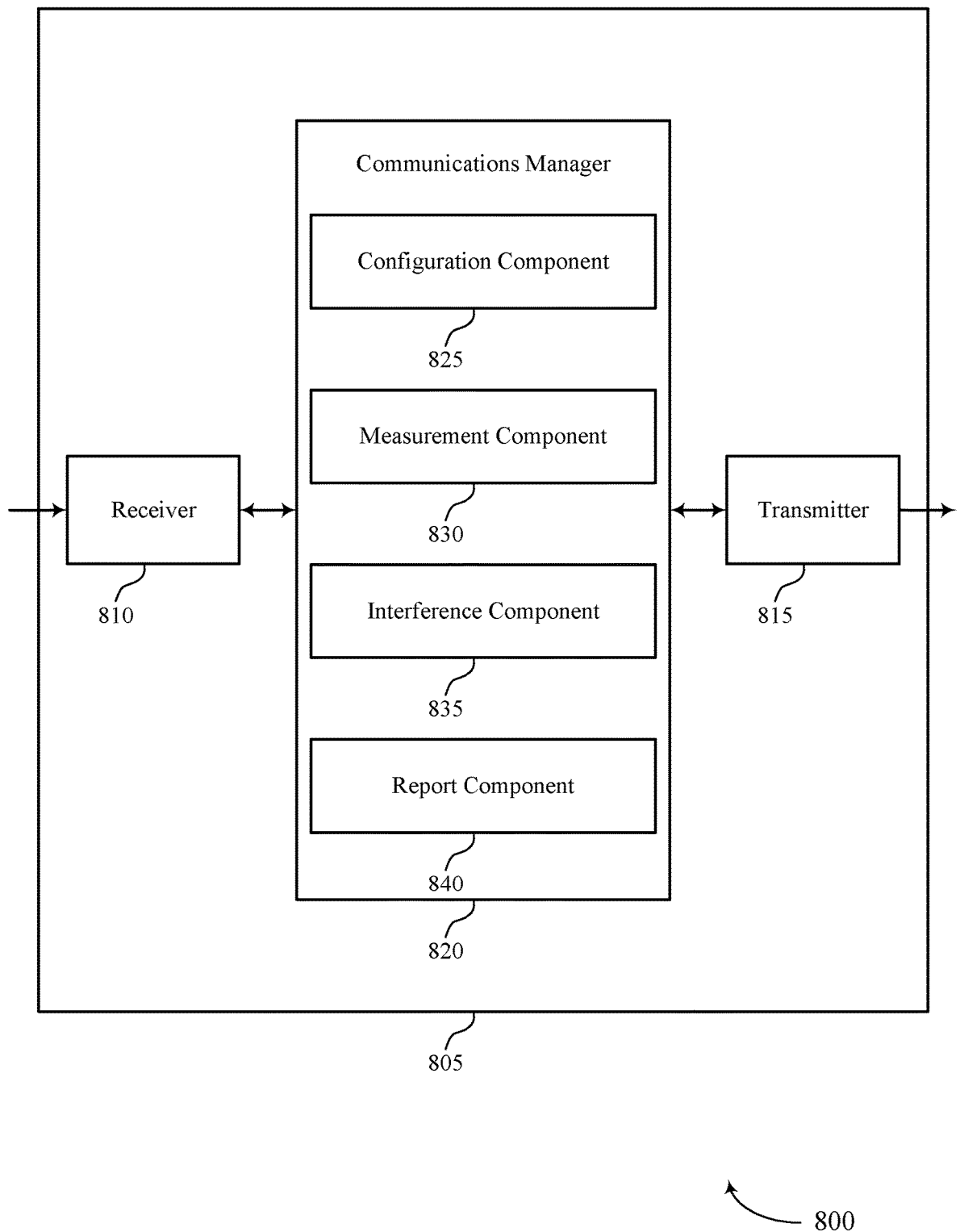

FIG. 8 shows a block diagram 800 of a device 805 that supports techniques for CLI measurements in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for CLI measurements). Information may be passed on to other components of the device 805. The receiver 810 may utilize a single antenna or a set of multiple antennas.

The transmitter 815 may provide a means for transmitting signals generated by other components of the device 805.

For example, the transmitter 815 may transmit information such as packets, user data, control information, or any combination thereof associated with various information channels (e.g., control channels, data channels, information channels related to techniques for CLI measurements). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for CLI measurements as described herein. For example, the communications manager 820 may include a configuration component 825, a measurement component 830, an interference component 835, a report component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE (e.g., the device 805) in a wireless communication system in accordance with examples as disclosed herein. The configuration component 825 may be configured as or otherwise support a means for receiving signaling indicating a configuration including a resource allocation of an SRS resource associated with a slot having more than 14 symbols. The measurement component 830 may be configured as or otherwise support a means for receiving, from a second UE, an SRS on the SRS resource associated with the slot. The interference component 835 may be configured as or otherwise support a means for determining a CLI associated with the second UE based on measuring the SRS on the SRS resource during the slot. The report component 840 may be configured as or otherwise support a means for transmitting a report including an indication of the CLI.

Additionally or alternatively, the communications manager 820 may support wireless communication at a UE (e.g., the device 805) in a wireless communication system in accordance with examples as disclosed herein. The configuration component 825 may be configured as or otherwise support a means for receiving signaling indicating a configuration including a resource allocation of a CLI resource associated with a slot having more than 14 symbols. The measurement component 830 may be configured as or otherwise support a means for measuring a RSSI on the CLI resource based on a criterion. The interference component 835 may be configured as or otherwise support a means for determining a CLI associated with a second UE based on the measuring of the RSSI on the CLI resource during the slot. The report component 840 may be configured as or otherwise support a means for transmitting a report including an indication of the CLI.

Figure 9:
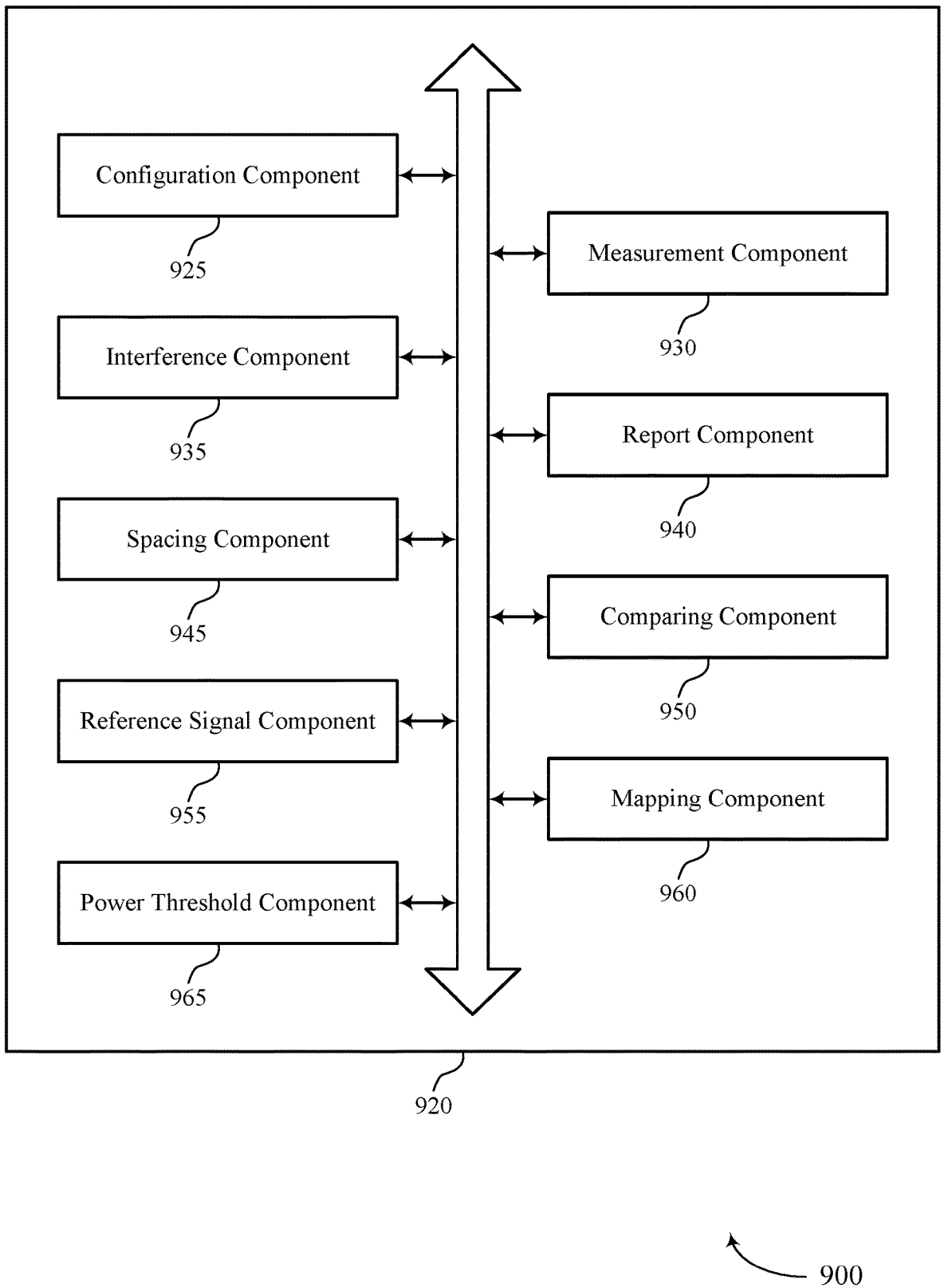
FIG. 9 shows a block diagram of a communications manager that supports techniques for CLI measurements in accordance with aspects of the present disclosure.

FIG. 9 shows a block diagram 900 of a communications manager 920 that supports techniques for CLI measurements in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for CLI measurements as described herein. For example, the communications manager 920 may include a configuration component 925, a measurement component 930, an interference component 935, a report component 940, a spacing component 945, a comparing component 950, a reference signal component 955, a mapping component 960, a power threshold component 965, or any combination thereof. Each of these components may communicate, directly or indirectly, with one another (e.g., via one or more buses).

The communications manager 920 may support wireless communication at a UE in a wireless communication system in accordance with examples as disclosed herein. The configuration component 925 may be configured as or otherwise support a means for receiving signaling indicating a configuration including a resource allocation of an SRS resource associated with a slot having more than 14 symbols. The measurement component 930 may be configured as or otherwise support a means for receiving, from a second UE, an SRS on the SRS resource associated with the slot. The interference component 935 may be configured as or otherwise support a means for determining a CLI associated with the second UE based on measuring the SRS on the SRS resource during the slot. The report component 940 may be configured as or otherwise support a means for transmitting a report including an indication of the CLI.

In some examples, the spacing component 945 may be configured as or otherwise support a means for determining an active BWP SCS of the UE. In some examples, the comparing component 950 may be configured as or otherwise support a means for comparing the active BWP SCS of the UE to a reference SCS of the received SRS from the second UE. In some examples, the interference component 935 may be configured as or otherwise support a means for measuring the SRS on the SRS resource based on the active BWP SCS of the UE corresponding to the reference SCS of the received SRS.

The reference signal component 955 may be configured as or otherwise support a means for determining a number of SRS symbols associated with the SRS resource based on the configuration. In some examples, the mapping component 960 may be configured as or otherwise support a means for mapping the number of SRS symbols to a number of SRS symbol locations in the slot. In some examples, the number of SRS symbols are within a slot boundary associated with the slot. In some examples, the slot having more than 14 symbols includes a set of multiple slots each having 14 or fewer symbols and the number of SRS symbols spans one or more slots of the set of multiple slots. In some examples, to support receiving the SRS, the measurement component 930 may be configured as or otherwise support a means for receiving the SRS on the number of SRS symbols in the slot based on the mapping of the number of SRS symbols to the number of SRS symbol locations in the slot.

In some examples, the number of SRS symbols includes one SRS symbol per the SRS resource, two SRS symbols per the SRS resource, or four SRS symbols per the SRS resource, or any combination thereof. In some examples, the number of SRS symbols correspond to a repetition factor indicating a repetition of SRS symbols in the slot. In some examples, the slot having more than 14 symbols includes two or more contiguous slots in a time domain. In some examples, the signaling includes an RRC message, a DCI message, or a MAC-CE message, or any combination thereof.

The interference component 935 may be configured as or otherwise support a means for measuring a RSRP based on the measuring of the SRS on the SRS resource. In some examples, the power threshold component 965 may be configured as or otherwise support a means for determining that the RSRP satisfies a threshold. In some examples, the interference component 935 may be configured as or otherwise support a means for determining the CLI from the second UE based on the determining that the RSRP satisfies the threshold.

Additionally or alternatively, the communications manager 920 may support wireless communication at a UE in a wireless communication system in accordance with examples as disclosed herein. In some examples, the configuration component 925 may be configured as or otherwise support a means for receiving signaling indicating a configuration including a resource allocation of a CLI resource associated with a slot having more than 14 symbols. In some examples, the measurement component 930 may be configured as or otherwise support a means for measuring a RSSI on the CLI resource based on a criterion. In some examples, the interference component 935 may be configured as or otherwise support a means for determining a CLI associated with a second UE based on the measuring of the RSSI on the CLI resource during the slot. In some examples, the report component 940 may be configured as or otherwise support a means for transmitting a report including an indication of the CLI.

The spacing component 945 may be configured as or otherwise support a means for determining an active BWP SCS of the UE. In some examples, the comparing component 950 may be configured as or otherwise support a means for comparing the active BWP SCS of the UE to a reference SCS of the CLI resource. In some examples, the measurement component 930 may be configured as or otherwise support a means for measuring the RSSI on the CLI resource based on the active BWP SCS of the UE corresponding to the reference SCS of the CLI resource. In some examples, the spacing component 945 may be configured as or otherwise support a means for determining that the reference SCS of the CLI resource and the active BWP SCS of the UE are the same. In some examples, the measurement component 930 may be configured as or otherwise support a means for measuring the RSSI on the CLI resource based on the determining that the reference SCS of the CLI resource and the active BWP SCS of the UE are the same. In some examples, the CLI resource crosses a slot boundary of the slot based on the reference SCS of the CLI resource.

The spacing component 945 may be configured as or otherwise support a means for determining that the reference SCS of the CLI resource is shorter than the active BWP SCS of the UE. In some examples, the measurement component 930 may be configured as or otherwise support a means for measuring the RSSI on the CLI resource based on the determining that the reference SCS of the CLI resource is shorter than the active BWP SCS of the UE. In some examples, the CLI resource is within a slot boundary of the slot having the more than 14 symbols based on the reference SCS of the CLI resource. In some examples, the CLI resource crosses a slot boundary of the slot having the more than 14 symbols based on the reference SCS of the CLI resource. The measurement component 930 may be configured as or otherwise support a means for measuring the RSSI on the CLI resource associated with the slot based on the slot overlapping with the CLI resource, where the slot having more than 14 symbols includes two or more slots. In some examples, the signaling includes an RRC message, a DCI message, or a MAC-CE message, or any combination thereof.

Figure 10:
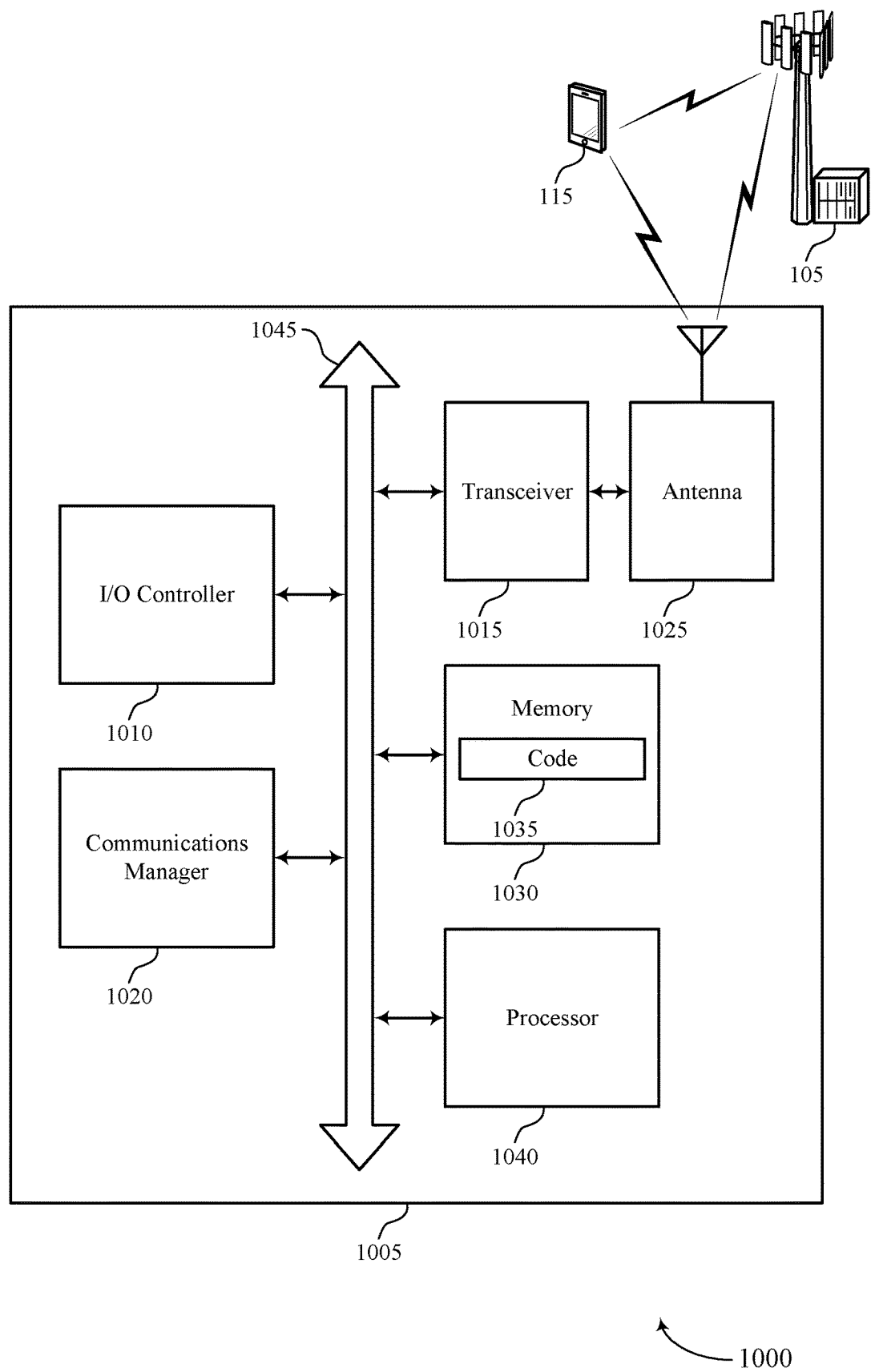
FIG. 10 shows a diagram of a system including a device that supports techniques for CLI measurements in accordance with aspects of the present disclosure.

FIG. 10 shows a diagram of a system 1000 including a device 1005 that supports techniques for CLI measurements in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for CLI measurements). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in a wireless communication system in accordance with examples as disclosed herein. For example, the communications manager 1020 may be configured as or otherwise support a means for receiving signaling indicating a configuration including a resource allocation of an SRS resource associated with a slot having more than 14 symbols. The communications manager 1020 may be configured as or otherwise support a means for receiving, from a second UE, an SRS on the SRS resource associated with the slot. The communications manager 1020 may be configured as or otherwise support a means for determining a CLI associated with the second UE based on measuring the SRS on the SRS resource during the slot. The communications manager 1020 may be configured as or otherwise support a means for transmitting a report including an indication of the CLI.

Additionally or alternatively, the communications manager 1020 may support wireless communication at a UE in a wireless communication system in accordance with examples as disclosed herein. For example, the communications manager 1020 may be configured as or otherwise support a means for receiving signaling indicating a configuration including a resource allocation of a CLI resource associated with a slot having more than 14 symbols. The communications manager 1020 may be configured as or otherwise support a means for measuring a RSSI on the CLI resource based on a criterion. The communications manager 1020 may be configured as or otherwise support a means for determining a CLI associated with a second UE based on the measuring of the RSSI on the CLI resource during the slot. The communications manager 1020 may be configured as or otherwise support a means for transmitting a report including an indication of the CLI.

By including or configuring the communications manager 1020 in accordance with examples as described herein, the device 1005 may support techniques for improved communication reliability and reduced latency, among other benefits. For example, the device 1005 may receive downlink communications with increased reliability based on using a slot with a slot duration greater than 14 symbols to perform a CLI measurement. As such, the device 1005 may reduce a number of retransmissions at the device 1005 and may experience reduced latency as a result of reducing the number of retransmissions.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for CLI measurements as described herein, or the processor 1040 and the memory 1030 may be otherwise configured to perform or support such operations.

Figure 11:
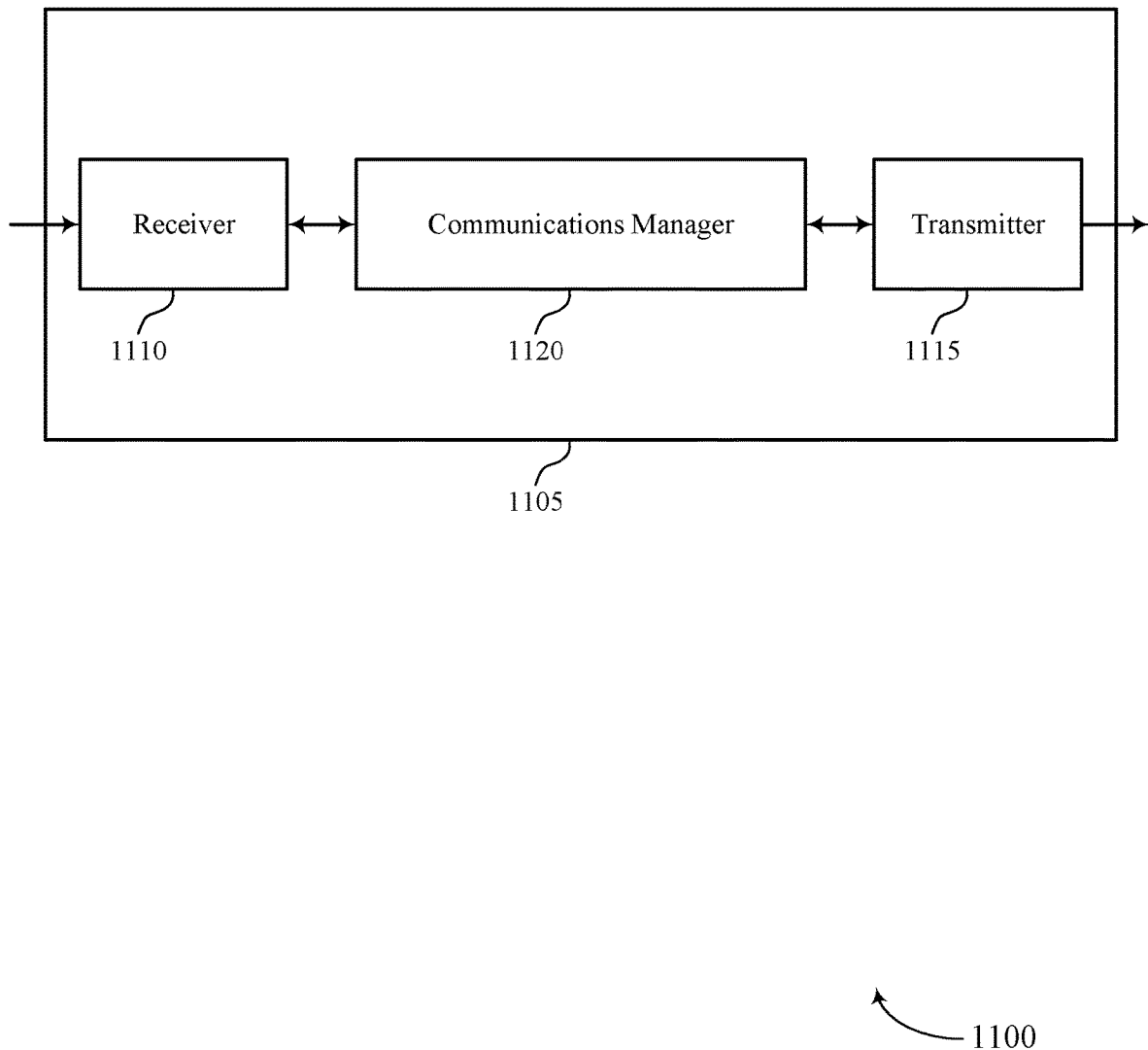
FIGS. 11 and 12 show block diagrams of devices that support techniques for CLI measurements in accordance with aspects of the present disclosure.

FIG. 11 shows a block diagram 1100 of a device 1105 that supports techniques for CLI measurements in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for CLI measurements). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for CLI measurements). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for CLI measurements as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110. The communications manager 1120 may send information to the transmitter 1115. The communications manager 1120 may be integrated in combination with the receiver 1110, the transmitter 1115, or both. The communications manager 1120 may receive information, transmit information, or perform various other operations as described herein.

The communications manager 1120 may support wireless communication at a base station (e.g., the device 1105) in a wireless communication system in accordance with examples as disclosed herein. For example, the communications manager 1120 may be configured as or otherwise support a means for transmitting, to a UE, signaling indicating a configuration including a resource allocation of an SRS resource associated with a slot having more than 14 symbols. The communications manager 1120 may be configured as or otherwise support a means for receiving, from the UE, a report including an indication of a measured CLI on the SRS resource.

Additionally or alternatively, the communications manager 1120 may support wireless communication at a base station (e.g., the device 1105) in a wireless communication system in accordance with examples as disclosed herein. For example, the communications manager 1120 may be configured as or otherwise support a means for transmitting, to a UE, signaling indicating a configuration including a resource allocation of a CLI resource associated with a slot having more than 14 symbols. The communications manager 1120 may be configured as or otherwise support a means for receiving, from the UE, a report including an indication of a measured CLI on the CLI resource.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced power consumption and reduced processing, among other benefits. For example, the device 1105 may reduce a number of retransmissions at the device 1105 based on configuring a UE to perform a CLI measurement in a slot with a slot duration greater than 14 symbols. As a result, the device 1105 may experience reduced power consumption and reduced processing based on reducing the number of retransmissions.

Figure 12:
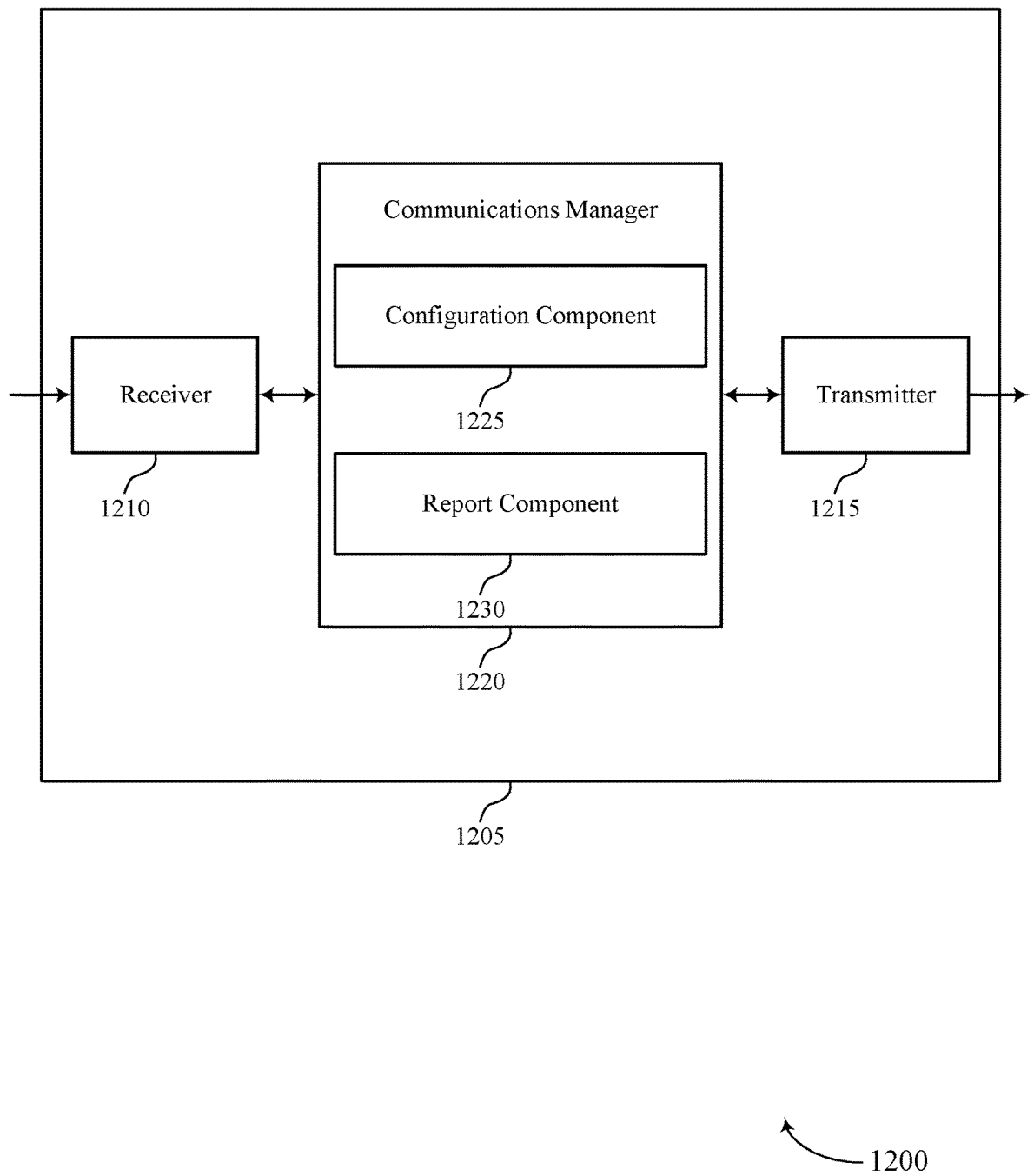

FIG. 12 shows a block diagram 1200 of a device 1205 that supports techniques for CLI measurements in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for CLI measurements). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for CLI measurements). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for CLI measurements as described herein. For example, the communications manager 1220 may include a configuration component 1225 a report component 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210. The communications manager 1220 may send information to the transmitter 1215. The communications manager 1220 may be integrated in combination with the receiver 1210, the transmitter 1215, or both. The communications manager 1220 may receive information, transmit information, or perform various other operations as described herein.

The communications manager 1220 may support wireless communication at a base station (e.g., the device 1205) in a wireless communication system in accordance with examples as disclosed herein. The configuration component 1225 may be configured as or otherwise support a means for transmitting, to a UE, signaling indicating a configuration including a resource allocation of an SRS resource associated with a slot having more than 14 symbols. The report component 1230 may be configured as or otherwise support a means for receiving, from the UE, a report including an indication of a measured CLI on the SRS resource.

Additionally or alternatively, the communications manager 1220 may support wireless communication at a base station (e.g., the device 1205) in a wireless communication system in accordance with examples as disclosed herein. The configuration component 1225 may be configured as or otherwise support a means for transmitting, to a UE, signaling indicating a configuration including a resource allocation of a CLI resource associated with a slot having more than 14 symbols. The report component 1230 may be configured as or otherwise support a means for receiving, from the UE, a report including an indication of a measured CLI on the CLI resource.

Figure 13:
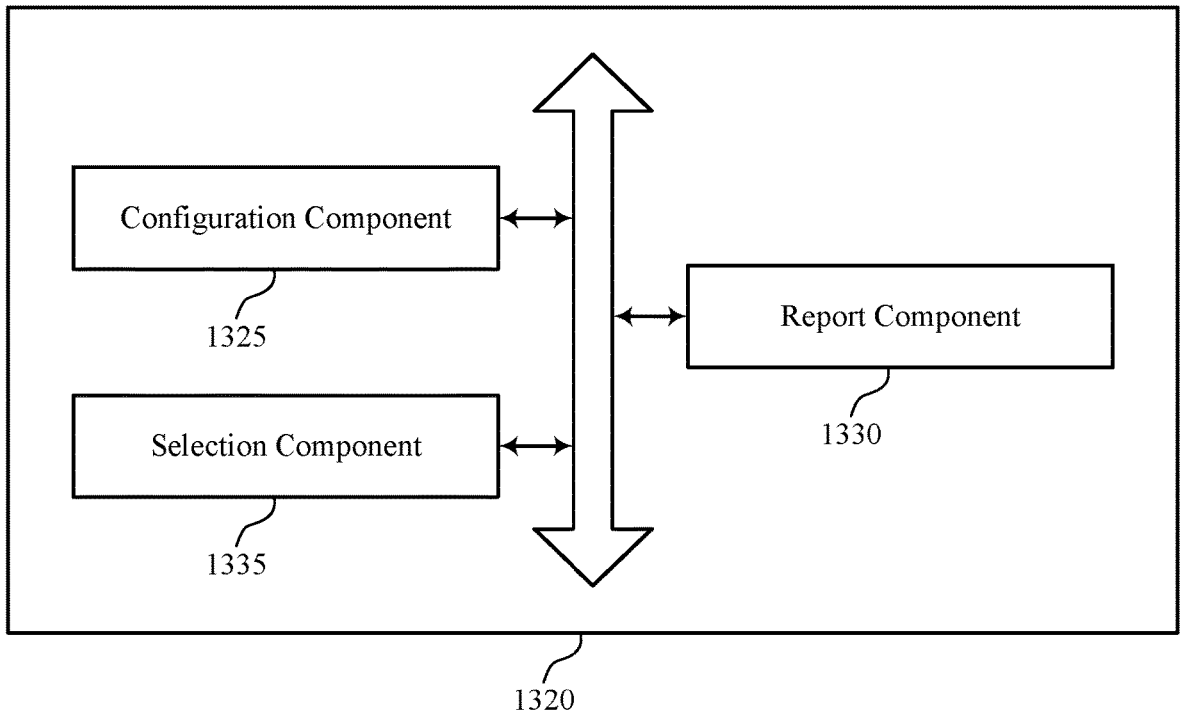
FIG. 13 shows a block diagram of a communications manager that supports techniques for CLI measurements in accordance with aspects of the present disclosure.

FIG. 13 shows a block diagram 1300 of a communications manager 1320 that supports techniques for CLI measurements in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for CLI measurements as described herein. For example, the communications manager 1320 may include a configuration component 1325, a report component 1330, a selection component 1335, or any combination thereof. Each of these components may communicate, directly or indirectly, with one another (e.g., via one or more buses).

The communications manager 1320 may support wireless communication at a base station in a wireless communication system in accordance with examples as disclosed herein. The configuration component 1325 may be configured as or otherwise support a means for transmitting, to a UE, signaling indicating a configuration including a resource allocation of an SRS resource associated with a slot having more than 14 symbols. The report component 1330 may be configured as or otherwise support a means for receiving, from the UE, a report including an indication of a measured CLI on the SRS resource.

The selection component 1335 may be configured as or otherwise support a means for selecting a TDD configuration designating uplink symbols or downlink symbols, or both, for the slot based on the measured CLI. In some examples, the configuration component 1325 may be configured as or otherwise support a means for transmitting, to the UE, the TDD configuration. In some examples, a number of SRS symbols associated with the SRS resource are within a slot boundary associated with the slot. In some examples, a number of SRS symbols associated with the SRS resource crosses a slot boundary associated with the slot. In some examples, the slot includes two or more contiguous slots in a time domain. In some examples, the signaling includes an RRC message, a DCI message, or a MAC-CE message, or any combination thereof.

Additionally or alternatively, the communications manager 1320 may support wireless communication at a base station in a wireless communication system in accordance with examples as disclosed herein. In some examples, the configuration component 1325 may be configured as or otherwise support a means for transmitting, to a UE, signaling indicating a configuration including a resource allocation of a CLI resource associated with a slot having more than 14 symbols. In some examples, the report component 1330 may be configured as or otherwise support a means for receiving, from the UE, a report including an indication of a measured CLI on the CLI resource.

In some examples, the selection component 1335 may be configured as or otherwise support a means for selecting a TDD configuration designating uplink symbols or downlink symbols, or both, for the slot based on the measured CLI on the CLI resource. In some examples, the configuration component 1325 may be configured as or otherwise support a means for transmitting, to the UE, the TDD configuration. In some examples, the CLI resource crosses a slot boundary of the slot based on a reference SCS of the CLI resource. In some examples, the CLI resource is within a slot boundary of the slot having the more than 14 symbols based on a reference SCS of the CLI resource.

Figure 14:
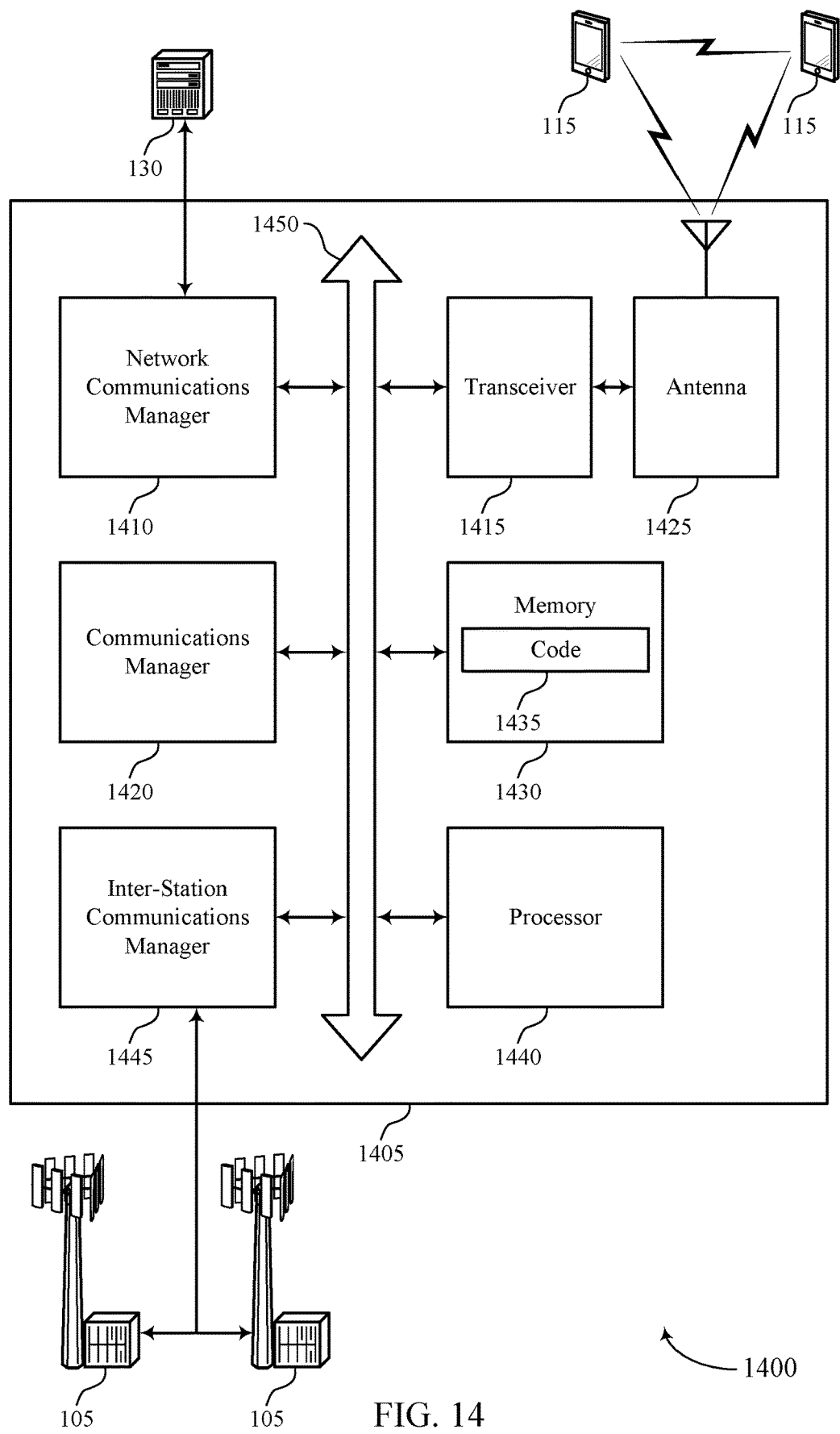
FIG. 14 shows a diagram of a system including a device that supports techniques for CLI measurements in accordance with aspects of the present disclosure.

FIG. 14 shows a diagram of a system 1400 including a device 1405 that supports techniques for CLI measurements in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for CLI measurements). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station (e.g., the device 1405) in a wireless communication system in accordance with examples as disclosed herein. For example, the communications manager 1420 may be configured as or otherwise support a means for transmitting, to a UE, signaling indicating a configuration including a resource allocation of an SRS resource associated with a slot having more than 14 symbols. The communications manager 1420 may be configured as or otherwise support a means for receiving, from the UE, a report including an indication of a measured CLI on the SRS resource.

Additionally or alternatively, the communications manager 1420 may support wireless communication at a base station (e.g., the device 1405) in a wireless communication system in accordance with examples as disclosed herein. For example, the communications manager 1420 may be configured as or otherwise support a means for transmitting, to a UE, signaling indicating a configuration including a resource allocation of a CLI resource associated with a slot having more than 14 symbols. The communications manager 1420 may be configured as or otherwise support a means for receiving, from the UE, a report including an indication of a measured CLI on the CLI resource.

By including or configuring the communications manager 1420 in accordance with examples as described herein, the device 1405 may support techniques for improved communication reliability and reduced latency, among other benefits. For example, the device 1405 may transmit downlink communications with increased reliability based on configuring a UE to perform a CLI measurement in a slot with a slot duration greater than 14 symbols. As such, the device 1405 may reduce a number of retransmissions at the device 1405 and may experience reduced latency based on reducing the number of retransmissions.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for CLI measurements as described herein, or the processor 1440 and the memory 1430 may be otherwise configured to perform or support such operations.

Figure 15:
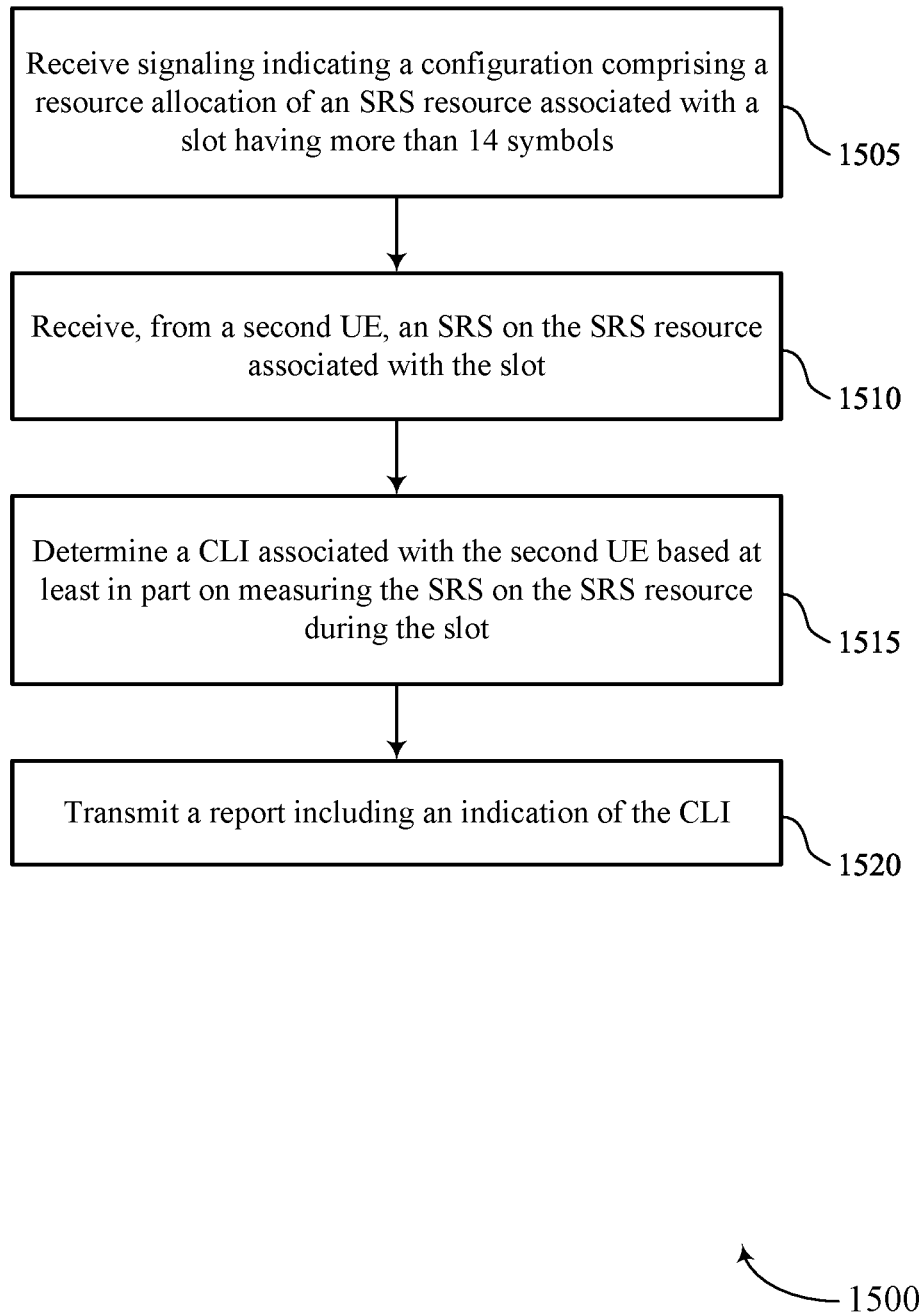
FIGS. 15 through 18 show flowcharts illustrating methods that support techniques for CLI measurements in accordance with aspects of the present disclosure.

FIG. 15 shows a flowchart illustrating a method 1500 that supports techniques for CLI measurements in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving signaling indicating a configuration including a resource allocation of an SRS resource associated with a slot having more than 14 symbols. The operations of 1505 may be performed in accordance with examples as disclosed herein. In some examples, aspects of the operations of 1505 may be performed by a configuration component 925 as described with reference to FIG. 9.

At 1510, the method may include receiving, from a second UE, an SRS on the SRS resource associated with the slot. The operations of 1510 may be performed in accordance with examples as disclosed herein. In some examples, aspects of the operations of 1510 may be performed by a measurement component 930 as described with reference to FIG. 9.

At 1515, the method may include determining a CLI associated with the second UE based on measuring the SRS on the SRS resource during the slot. The operations of 1515 may be performed in accordance with examples as disclosed herein. In some examples, aspects of the operations of 1515 may be performed by an interference component 935 as described with reference to FIG. 9.

At 1520, the method may include transmitting a report including an indication of the CLI. The operations of 1520 may be performed in accordance with examples as disclosed herein. In some examples, aspects of the operations of 1520 may be performed by a report component 940 as described with reference to FIG. 9.

Figure 16:
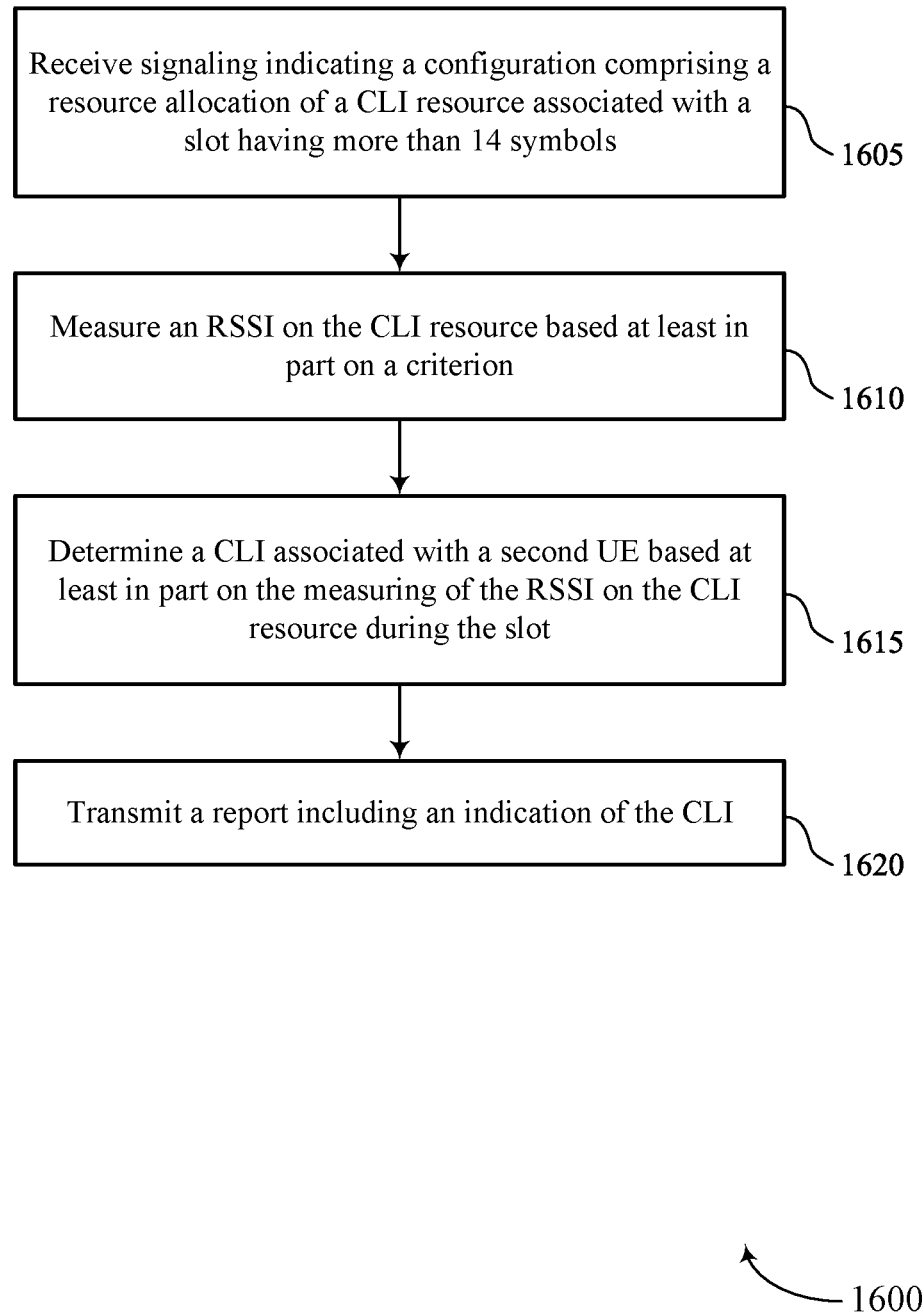

FIG. 16 shows a flowchart illustrating a method 1600 that supports techniques for CLI measurements in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving signaling indicating a configuration including a resource allocation of a CLI resource associated with a slot having more than 14 symbols. The operations of 1605 may be performed in accordance with examples as disclosed herein. In some examples, aspects of the operations of 1605 may be performed by a configuration component 925 as described with reference to FIG. 9.

At 1610, the method may include measuring an RSSI on the CLI resource based on a criterion. The operations of 1610 may be performed in accordance with examples as disclosed herein. In some examples, aspects of the operations of 1610 may be performed by a measurement component 930 as described with reference to FIG. 9.

At 1615, the method may include determining a CLI associated with a second UE based on the measuring of the RSSI on the CLI resource during the slot. The operations of 1615 may be performed in accordance with examples as disclosed herein. In some examples, aspects of the operations of 1615 may be performed by an interference component 935 as described with reference to FIG. 9.

At 1620, the method may include transmitting a report including an indication of the CLI. The operations of 1620 may be performed in accordance with examples as disclosed herein. In some examples, aspects of the operations of 1620 may be performed by a report component 940 as described with reference to FIG. 9.

Figure 17:
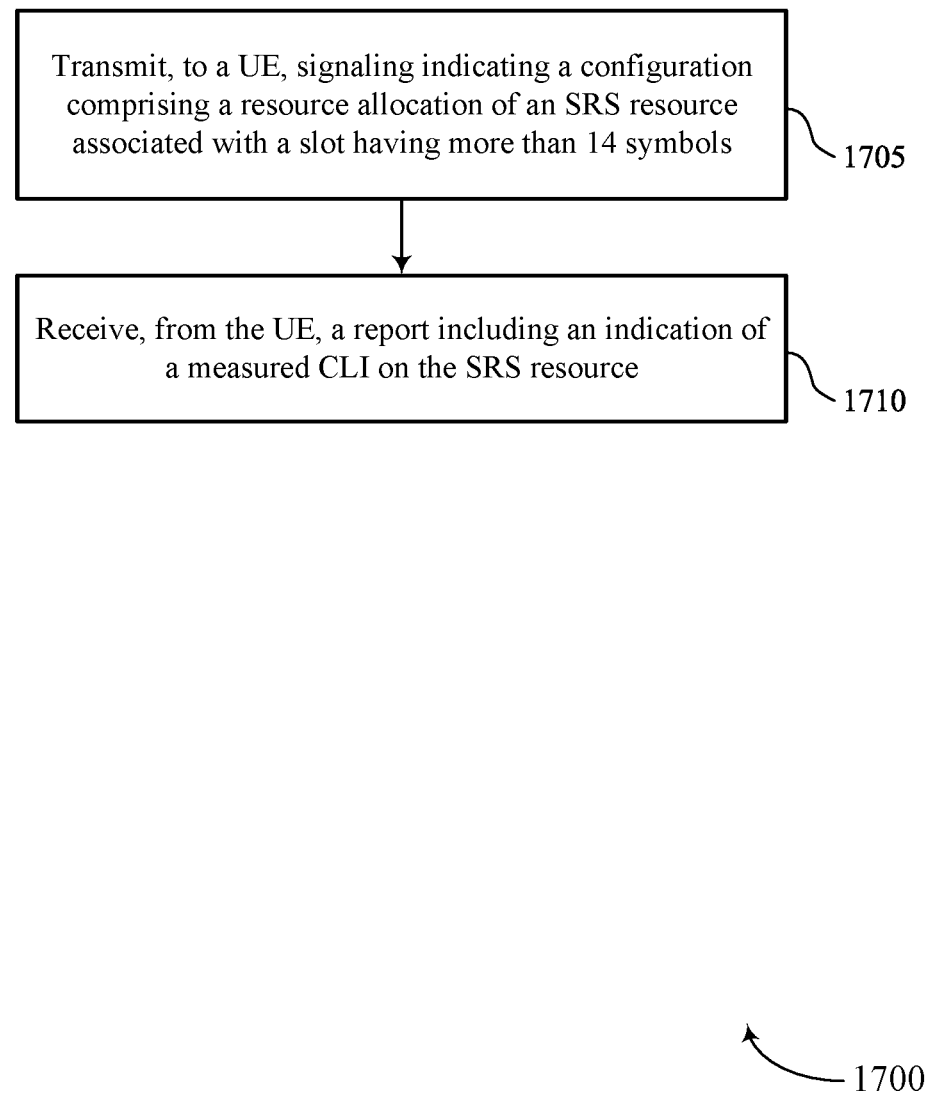

FIG. 17 shows a flowchart illustrating a method 1700 that supports techniques for CLI measurements in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, signaling indicating a configuration including a resource allocation of an SRS resource associated with a slot having more than 14 symbols. The operations of 1705 may be performed in accordance with examples as disclosed herein. In some examples, aspects of the operations of 1705 may be performed by a configuration component 1325 as described with reference to FIG. 13.

At 1710, the method may include receiving, from the UE, a report including an indication of a measured CLI on the SRS resource. The operations of 1710 may be performed in accordance with examples as disclosed herein. In some examples, aspects of the operations of 1710 may be performed by a report component 1330 as described with reference to FIG. 13.

Figure 18:
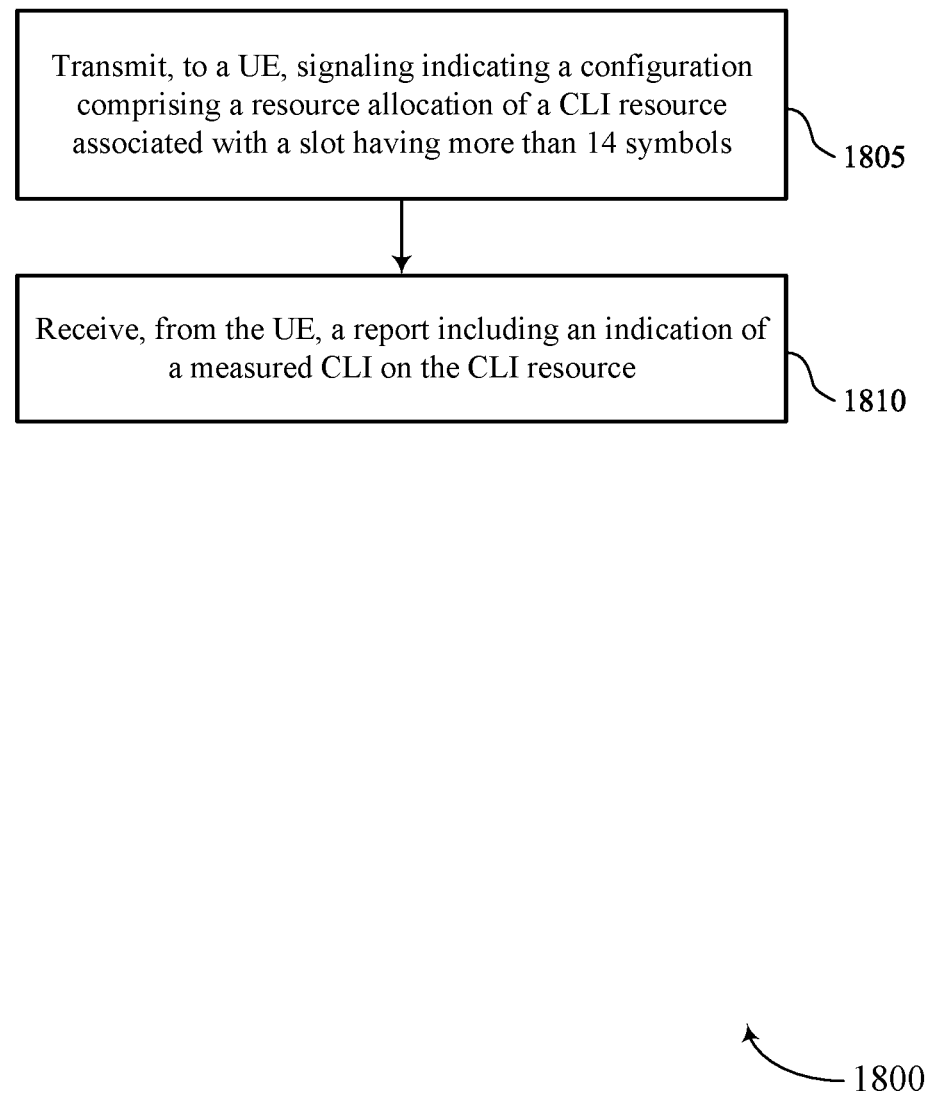

FIG. 18 shows a flowchart illustrating a method 1800 that supports techniques for CLI measurements in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, signaling indicating a configuration including a resource allocation of a CLI resource associated with a slot having more than 14 symbols. The operations of 1805 may be performed in accordance with examples as disclosed herein. In some examples, aspects of the operations of 1805 may be performed by a configuration component 1325 as described with reference to FIG. 13.

At 1810, the method may include receiving, from the UE, a report including an indication of a measured CLI on the CLI resource. The operations of 1810 may be performed in accordance with examples as disclosed herein. In some examples, aspects of the operations of 1810 may be performed by a report component 1330 as described with reference to FIG. 13.

The following provides an overview of aspects of the present disclosure:

Aspect 1: A method for wireless communication at a UE in a wireless communication system, comprising: receiving signaling indicating a configuration comprising a resource allocation of a SRS resource associated with a slot having more than fourteen symbols; receiving, from a second UE, a SRS on the SRS resource associated with the slot; determining a CLI associated with the second UE based at least in part on measuring the SRS on the SRS resource during the slot; and transmitting a report including an indication of the CLI.

Aspect 2: The method of aspect 1, further comprising: determining an active bandwidth part subcarrier spacing of the UE; and comparing the active bandwidth part subcarrier spacing of the UE to a reference subcarrier spacing of the received SRS from the second UE, wherein measuring the SRS on the SRS resource is based at least in part on the active bandwidth part subcarrier spacing of the UE corresponding to the reference subcarrier spacing of the received SRS.

Aspect 3: The method of any of aspects 1 through 2, further comprising: determining a number of SRS symbols associated with the SRS resource based at least in part on the configuration; and mapping the number of SRS symbols to a number of SRS symbol locations in the slot.

Aspect 4: The method of aspect 3, wherein the number of SRS symbols are within a slot boundary associated with the slot.

Aspect 5: The method of any of aspects 3 through 4, wherein the slot having more than fourteen symbols comprises a plurality of slots each having fourteen or fewer symbols and the number of SRS symbols spans one or more slots of the plurality of slots.

Aspect 6: The method of any of aspects 3 through 5, wherein receiving the SRS comprises: receiving the SRS on the number of SRS symbols in the slot based at least in part on the mapping of the number of SRS symbols to the number of SRS symbol locations in the slot.

Aspect 7: The method of any of aspects 3 through 6, wherein the number of SRS symbols comprises one SRS symbol per the SRS resource, two SRS symbols per the SRS resource, or four SRS symbols per the SRS resource, or any combination thereof.

Aspect 8: The method of any of aspects 3 through 7, wherein the number of SRS symbols correspond to a repetition factor indicating a repetition of SRS symbols in the slot.

Aspect 9: The method of any of aspects 1 through 8, wherein the slot having more than fourteen symbols comprises two or more contiguous slots in a time domain.

Aspect 10: The method of any of aspects 1 through 9, wherein the signaling comprises a radio resource control message, a downlink control information message, or a medium access control-control element message, or any combination thereof.

Aspect 11: The method of any of aspects 1 through 10, further comprising: measuring a RSRP based at least in part on the measuring of the SRS on the SRS resource; and determining that the RSRP satisfies a threshold, wherein determining the CLI from the second UE is based at least in part on the determining that the RSRP satisfies the threshold.

Aspect 12: A method for wireless communication at a UE in a wireless communication system, comprising: receiving signaling indicating a configuration comprising a resource allocation of a CLI resource associated with a slot having more than fourteen symbols; measuring a RSSI on the CLI resource based at least in part on a criterion; determining a CLI associated with a second UE based at least in part on the measuring of the RSSI on the CLI resource during the slot; and transmitting a report including an indication of the CLI.

Aspect 13: The method of aspect 12, further comprising: determining an active bandwidth part subcarrier spacing of the UE; and comparing the active bandwidth part subcarrier spacing of the UE to a reference subcarrier spacing of the CLI resource, wherein measuring the RSSI on the CLI resource is based at least in part on the active bandwidth part subcarrier spacing of the UE corresponding to the reference subcarrier spacing of the CLI resource.

Aspect 14: The method of aspect 13, further comprising: determining that the reference subcarrier spacing of the CLI resource and the active bandwidth part subcarrier spacing of the UE are the same, wherein measuring the RSSI on the CLI resource is based at least in part on the determining that the reference subcarrier spacing of the CLI resource and the active bandwidth part subcarrier spacing of the UE are the same.

Aspect 15: The method of aspect 14, wherein the CLI resource crosses a slot boundary of the slot based at least in part on the reference subcarrier spacing of the CLI resource.

Aspect 16: The method of any of aspects 13 through 15, further comprising: determining that the reference subcarrier spacing of the CLI resource is shorter than the active bandwidth part subcarrier spacing of the UE, wherein measuring the RSSI on the CLI resource is based at least in part on the determining that the reference subcarrier spacing of the CLI resource is shorter than the active bandwidth part subcarrier spacing of the UE.

Aspect 17: The method of aspect 16, wherein the CLI resource is within a slot boundary of the slot having the more than fourteen symbols based at least in part on the reference subcarrier spacing of the CLI resource.

Aspect 18: The method of any of aspects 16 through 17, wherein the CLI resource crosses a slot boundary of the slot having the more than fourteen symbols based at least in part on the reference subcarrier spacing of the CLI resource.

Aspect 19: The method of any of aspects 16 through 18, further comprising: measuring the RSSI on the CLI resource associated with the slot based at least in part on the slot overlapping with the CLI resource, wherein the slot having more than fourteen symbols comprises two or more slots.

Aspect 20: The method of any of aspects 12 through 19, wherein the signaling comprises an RRC message, a DCI message, or a MAC-CE message, or any combination thereof.

Aspect 21: A method for wireless communication at a base station in a wireless communication system, comprising: transmitting, to a UE, signaling indicating a configuration comprising a resource allocation of a SRS resource associated with a slot having more than fourteen symbols; and receiving, from the UE, a report including an indication of a measured CLI on the SRS resource.

Aspect 22: The method of aspect 21, further comprising: selecting a time division duplex configuration designating uplink symbols or downlink symbols, or both, for the slot based at least in part on the measured CLI; and transmitting, to the UE, the time division duplex configuration.

Aspect 23: The method of any of aspects 21 through 22, wherein a number of SRS symbols associated with the SRS resource are within a slot boundary associated with the slot.

Aspect 24: The method of any of aspects 21 through 23, wherein a number of SRS symbols associated with the SRS resource crosses a slot boundary associated with the slot.

Aspect 25: The method of any of aspects 21 through 24, wherein the slot comprises two or more contiguous slots in a time domain.

Aspect 26: The method of any of aspects 21 through 25, wherein the signaling comprises an RRC message, a DCI message, or a MAC-CE message, or a combination thereof.

Aspect 27: A method for wireless communication at a base station in a wireless communication system, comprising: transmitting, to a UE, signaling indicating a configuration comprising a resource allocation of a CLI resource associated with a slot having more than fourteen symbols; and receiving, from the UE, a report including an indication of a measured CLI on the CLI resource.

Aspect 28: The method of aspect 27, further comprising: selecting a time division duplex configuration designating uplink symbols or downlink symbols, or both, for the slot based at least in part on the measured CLI on the CLI resource; and transmitting, to the UE, the time division duplex configuration.

Aspect 29: The method of any of aspects 27 through 28, wherein the CLI resource crosses a slot boundary of the slot based at least in part on a reference subcarrier spacing of the CLI resource.

Aspect 30: The method of any of aspects 27 through 29, wherein the CLI resource is within a slot boundary of the slot having the more than fourteen symbols based at least in part on a reference subcarrier spacing of the CLI resource.

Aspect 31: An apparatus for wireless communication at a UE in a wireless communication system, comprising a processor; memory coupled with the processor; and instructions stored in the memory and executable by the processor to cause the apparatus to perform a method of any of aspects 1 through 11.

Aspect 32: An apparatus for wireless communication at a UE in a wireless communication system, comprising at least one means for performing a method of any of aspects 1 through 11.

Aspect 33: A non-transitory computer-readable medium storing code for wireless communication at a UE in a wireless communication system, the code comprising instructions executable by a processor to perform a method of any of aspects 1 through 11.

Aspect 34: An apparatus for wireless communication at a UE in a wireless communication system, comprising a processor; memory coupled with the processor; and instructions stored in the memory and executable by the processor to cause the apparatus to perform a method of any of aspects 12 through 20.

Aspect 35: An apparatus for wireless communication at a UE in a wireless communication system, comprising at least one means for performing a method of any of aspects 12 through 20.

Aspect 36: A non-transitory computer-readable medium storing code for wireless communication at a UE in a wireless communication system, the code comprising instructions executable by a processor to perform a method of any of aspects 12 through 20.

Aspect 37: An apparatus for wireless communication at a base station in a wireless communication system, comprising a processor; memory coupled with the processor; and instructions stored in the memory and executable by the processor to cause the apparatus to perform a method of any of aspects 21 through 26.

Aspect 38: An apparatus for wireless communication at a base station in a wireless communication system, comprising at least one means for performing a method of any of aspects 21 through 26.

Aspect 39: A non-transitory computer-readable medium storing code for wireless communication at a base station in a wireless communication system, the code comprising instructions executable by a processor to perform a method of any of aspects 21 through 26.

Aspect 40: An apparatus for wireless communication at a base station in a wireless communication system, comprising a processor; memory coupled with the processor; and instructions stored in the memory and executable by the processor to cause the apparatus to perform a method of any of aspects 27 through 30.

Aspect 41: An apparatus for wireless communication at a base station in a wireless communication system, comprising at least one means for performing a method of any of aspects 27 through 30.

Aspect 42: A non-transitory computer-readable medium storing code for wireless communication at a base station in a wireless communication system, the code comprising instructions executable by a processor to perform a method of any of aspects 27 through 30

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE) in a wireless communication system, comprising:
receiving an indication of a configuration for a sounding reference signal resource within a slot that includes more than fourteen symbols, wherein the configuration is based at least in part a first subcarrier spacing associated with the sounding reference signal resource and a second subcarrier spacing associated with an active bandwidth part of the UE;
receiving, based at least in part on the configuration, a sounding reference signal on the sounding reference signal resource within the slot that includes more than fourteen symbols;
and
transmitting an indication of a cross-link interference level associated with a second UE based at least in part on measuring the sounding reference signal on the sounding reference signal resource within the slot that includes more than fourteen symbols.

2. The method of claim 1, further comprising:
determining an active bandwidth part subcarrier spacing of the UE; and
comparing the active bandwidth part subcarrier spacing of the UE to a reference subcarrier spacing of the sounding reference signal from the second UE, wherein measuring the sounding reference signal on the sounding reference signal resource is based at least in part on the active bandwidth part subcarrier spacing of the UE corresponding to the reference subcarrier spacing of the sounding reference signal.

3. The method of claim 1, further comprising:
determining a number of sounding reference signal symbols associated with the sounding reference signal resource based at least in part on the configuration; and
mapping the number of sounding reference signal symbols to a number of sounding reference signal symbol locations in the slot.

4. The method of claim 3, wherein the number of sounding reference signal symbols are within a slot boundary associated with the slot.

5. The method of claim 3, wherein the slot having more than fourteen symbols comprises a plurality of slots each having fourteen or fewer symbols and the number of sounding reference signal symbols spans one or more slots of the plurality of slots.

6. The method of claim 3, wherein receiving the sounding reference signal comprises:
receiving the sounding reference signal on the number of sounding reference signal symbols in the slot based at least in part on mapping the number of sounding reference signal symbols to the number of sounding reference signal symbol locations in the slot.

7. The method of claim 3, wherein the number of sounding reference signal symbols comprises one sounding reference signal symbol per the sounding reference signal resource, two sounding reference signal symbols per the sounding reference signal resource, or four sounding reference signal symbols per the sounding reference signal resource, or any combination thereof.

8. The method of claim 3, wherein the number of sounding reference signal symbols correspond to a repetition factor indicating a repetition of sounding reference signal symbols in the slot.

9. The method of claim 1, wherein the slot having more than fourteen symbols comprises two or more contiguous slots in a time domain.

10. The method of claim 1, wherein receiving the indication of the configuration comprises:
receiving one or more of a radio resource control message, a downlink control information message, or a medium access control-control element message, that indicates the configuration for the sounding reference signal resource.

11. The method of claim 1, further comprising:
measuring a reference signal received power based at least in part on measuring the sounding reference signal on the sounding reference signal resource; and
determining that the reference signal received power satisfies a threshold, wherein the cross-link interference level associated with the second UE is based at least in part on the reference signal received power satisfying the threshold.

12. A method for wireless communication at a user equipment (UE) in a wireless communication system, comprising:
receiving an indication of a configuration for a cross-link interference resource within a slot that includes more than fourteen symbols, wherein the configuration is based at least in part a first subcarrier spacing associated with the cross-link interference resource and a second subcarrier spacing associated with an active bandwidth part of the UE;
measuring a reference signal strength of the cross-link interference resource based at least in part on receiving a cross-link interference reference signal via the cross-link interference resource in the slot that includes more than fourteen symbols;
and
transmitting an indication of a cross-link interference level associated with a second UE based at least in part on measuring the reference signal strength of the cross-link interference resource in the slot that includes more than fourteen symbols.

13. The method of claim 12, further comprising:
determining an active bandwidth part subcarrier spacing of the UE; and
comparing the active bandwidth part subcarrier spacing of the UE to a reference subcarrier spacing of the cross-link interference resource, wherein measuring the reference signal strength of the cross-link interference resource is based at least in part on the active bandwidth part subcarrier spacing of the UE corresponding to the reference subcarrier spacing of the cross-link interference resource.

14. The method of claim 13, further comprising:
determining that the reference subcarrier spacing of the cross-link interference resource and the active bandwidth part subcarrier spacing of the UE are equal, wherein measuring the reference signal strength of the cross-link interference resource is based at least in part on determining that the reference subcarrier spacing of the cross-link interference resource and the active bandwidth part subcarrier spacing of the UE are equal.

15. The method of claim 14, wherein the cross-link interference resource crosses a slot boundary of the slot based at least in part on the reference subcarrier spacing of the cross-link interference resource.

16. The method of claim 13, further comprising:
determining that the reference subcarrier spacing of the cross-link interference resource is shorter than the active bandwidth part subcarrier spacing of the UE, wherein measuring the reference signal strength of the cross-link interference resource is based at least in part on determining that the reference subcarrier spacing of the cross-link interference resource is shorter than the active bandwidth part subcarrier spacing of the UE.

17. The method of claim 16, wherein the cross-link interference resource is within a slot boundary of the slot having the more than fourteen symbols based at least in part on the reference subcarrier spacing of the cross-link interference resource.

18. The method of claim 16, wherein the cross-link interference resource crosses a slot boundary of the slot having the more than fourteen symbols based at least in part on the reference subcarrier spacing of the cross-link interference resource.

19. The method of claim 16, further comprising:
measuring the reference signal strength of the cross-link interference resource associated with the slot based at least in part on the slot overlapping with the cross-link interference resource, wherein the slot having more than fourteen symbols comprises two or more slots.

20. The method of claim 12, wherein receiving the indication of the configuration comprises:
receiving one or more of a radio resource control message, a downlink control information message, or a medium access control-control element message, that indicates the configuration for the cross-link interference resource.

21. A method for wireless communication at a network entity in a wireless communication system, comprising:
transmitting an indication of a configuration for a sounding reference signal resource within a slot that includes more than fourteen symbols, wherein the configuration is based at least in part a first subcarrier spacing associated with the sounding reference signal resource and a second subcarrier spacing associated with an active bandwidth part of a user equipment (UE); and
receiving an indication of a cross-link interference level associated with a second UE based at least in part on the configuration, wherein the cross-link interference level is based at least in part on a measurement of a sounding reference signal on the sounding reference signal resource within the slot that includes more than fourteen symbols.

22. The method of claim 21, further comprising:
selecting a time division duplex configuration designating uplink symbols or downlink symbols, or both, for the slot based at least in part on the cross-link interference level associated with the second UE; and
transmitting, to the UE, an indication of the time division duplex configuration.

23. The method of claim 21, wherein a number of sounding reference signal symbols associated with the sounding reference signal resource are within a slot boundary associated with the slot.

24. The method of claim 21, wherein a number of sounding reference signal symbols associated with the sounding reference signal resource crosses a slot boundary associated with the slot.

25. The method of claim 21, wherein the slot comprises two or more contiguous slots in a time domain.

26. The method of claim 21, wherein transmitting the indication of the configuration comprises:
transmitting one or more of a radio resource control message, a downlink control information message, or a medium access control-control element message that indicates the configuration for the sounding reference signal resource.

27. A method for wireless communication at a network entity in a wireless communication system, comprising:
transmitting an indication of a configuration for a cross-link interference resource within a slot that includes more than fourteen symbols, wherein the configuration is based at least in part a first subcarrier spacing associated with the cross-link interference resource and a second subcarrier spacing associated with an active bandwidth part of a user equipment (UE); and
receiving an indication of a cross-link interference level associated with a second UE based at least in part on the configuration, wherein the cross-link interference level is based at least in part on a measurement of a cross-link interference reference signal on the cross-link interference resource within the slot that includes more than fourteen symbols.

28. The method of claim 27, further comprising:
selecting a time division duplex configuration designating uplink symbols or downlink symbols, or both, for the slot based at least in part on the cross-link interference level associated with the second UE; and
transmitting, to the UE, an indication of the time division duplex configuration.

29. The method of claim 27, wherein the cross-link interference resource crosses a slot boundary of the slot based at least in part on a reference subcarrier spacing of the cross-link interference resource.

30. The method of claim 27, wherein the cross-link interference resource is within a slot boundary of the slot having the more than fourteen symbols based at least in part on a reference subcarrier spacing of the cross-link interference resource.

* * * * *